(12) United States Patent
Porter et al.

(10) Patent No.: US 11,525,045 B2
(45) Date of Patent: Dec. 13, 2022

(54) CHEMICALLY MODIFIED POLYESTERS AND PROCESS FOR MAKING

(71) Applicant: DDP Specialty Electronic Materials US, LLC., Wilmington, DE (US)

(72) Inventors: Michal Elizabeth Porter, Midland, MI (US); Mark Alan Barger, Midland, MI (US); Yiyong He, Midland, MI (US); Stéphane Costeux, Midland, MI (US); Gerald F Billovits, Midland, MI (US); Wenyi Huang, Midland, MI (US); Edoardo Nicoli, Midland, MI (US)

(73) Assignee: DDP SPECIALTY ELECTRONIC MATERIALS US, INC., Wilmington, DE (US)

( * ) Notice: Subject to any disclaimer, the term of this patent is extended or adjusted under 35 U.S.C. 154(b) by 280 days.

(21) Appl. No.: 16/832,559

(22) Filed: Mar. 27, 2020

(65) Prior Publication Data
US 2020/0308363 A1    Oct. 1, 2020

Related U.S. Application Data

(60) Provisional application No. 62/826,343, filed on Mar. 29, 2019.

(51) Int. Cl.
*C08G 63/64* (2006.01)
*C08J 9/14* (2006.01)
*C08G 63/672* (2006.01)

(52) U.S. Cl.
CPC .............. *C08J 9/144* (2013.01); *C08G 63/64* (2013.01); *C08G 63/672* (2013.01); *C08J 2201/03* (2013.01); *C08J 2203/142* (2013.01); *C08J 2367/02* (2013.01); *C08J 2369/00* (2013.01)

(58) Field of Classification Search
USPC .......... 521/60; 528/190, 193, 194, 196, 198, 528/272
See application file for complete search history.

(56) References Cited

U.S. PATENT DOCUMENTS

| | | |
|---|---|---|
| 3,470,114 A | 9/1969 | Siggel et al. |
| 4,462,947 A | 7/1984 | Huggard |
| 4,466,933 A | 8/1984 | Huggard |
| 4,544,677 A | 10/1985 | Allen et al. |
| 5,475,037 A | 12/1995 | Park et al. |
| 6,020,393 A | 2/2000 | Khemani |
| 6,214,897 B1 | 4/2001 | Tung et al. |
| 6,306,921 B1 | 10/2001 | Al Ghatta et al. |
| 9,249,270 B2 | 2/2016 | Sampath et al. |
| 2018/0282475 A1 | 10/2018 | Mondschein et al. |

FOREIGN PATENT DOCUMENTS

EP    2736930 B1    4/2016

OTHER PUBLICATIONS

Fiorini, M. "Reactive blending of poly(ethylene terephthalate) and bisphenol-A polycarbonate: effect of various catalysts and mixing time on the extent of exchange reactions", Polymer, vol. 38, Issue 2, Jan. 1997, pp. 413-419.
International Search Report and Written Opinion in International Application PCT/US2020/025328, dated Jul. 1, 2020.

*Primary Examiner* — Terressa Boykin

(57) ABSTRACT

Chemically modified polyesters, foamable compositions thereof that form low density foams, and methods of making the foamable compositions and foams are disclosed. The compositions comprise an amorphous copolyester, or amorphous co-polyesterpolycarbonate or amorphous co-polyesterpolyether or combination thereof. Additionally, uses for the low density foams are disclosed.

20 Claims, 3 Drawing Sheets

US 11,525,045 B2

CHEMICALLY MODIFIED POLYESTERS AND PROCESS FOR MAKING

FIELD OF THE INVENTION

Described herein are chemically modified polyesters and methods of making same. More particularly, the chemically modified polyesters are amorphous copolymers. Furthermore, methods of making and using these compositions are described herein. The methods disclosed herein can utilize virgin or recycled polyester polymers as the source polymer, such as, for example, semi-crystalline polyethylene terephthalate (PET), including recycled PET, to form amorphous copolyesters that can be used as a component in a foamable composition. The resulting low density foams disclosed herein (for example, a density of 0.1 g/cm$^3$ or lower) can be utilized, for example, for extruded and expanded bead foam which may find use as, for example, insulation and/or other building and industrial applications.

BACKGROUND OF THE INVENTION

Crystalline and semicrystalline polyester polymers cannot be readily foamed to produce a low density foam because their crystalline or semicrystalline nature means that high temperatures are required to keep the material from re-crystallizing while gases expand and produce a foam. In the melted state, above its recrystallization temperature, the viscosity of semicrystalline polyester, such as PET, is too low to allow for significant expansion of cells prior to hardening. This limits the foam density that can be achieved (limiting to higher density foams, for example, a density greater than 0.1 g/cm$^3$). The present invention solves the problem of foaming crystalline or semicrystalline polyesters to produce low density foams by converting semicrystalline polyester, such as PET, into an amorphous copolyester polymer material capable of producing a low density foam from the polymer melt or from extruded and expanded beads.

Producing a foamable polyester or copolyester derived from semicrystalline PET allows the starting material to be sourced from a 'recycled' stream (from bottles and other post-consumer PET sources). For the purposes of this invention, 'recycled' refers to both post-consumer and post-industrial sourced materials. Recycled PET is abundant in supply. Accordingly, one particularly desirable objective would be to utilize recycled semicrystalline PET and convert it to an amorphous polymer that can be foamed to produce low density foams. Therefore, there is a need for foamable compositions containing amorphous polymers derived from semicrystalline polyesters, either virgin or recycled polyesters, such as recycled PET, methods for preparing the amorphous polymers and foamable compositions, and methods for using them. The invention is directed to these, as well as other, important ends.

SUMMARY OF THE INVENTION

In one embodiment, the invention relates to a copolyester, co-polyesterpolycarbonate or co-polyesterpolyether copolymer comprising either differing polyester units, or comprising polyester units and polycarbonate or polyether units or both, and optionally further comprising one or more coupling agents, and being characterized by having:
(i) polymerized units of one or more aromatic diacid monomer;
(ii) from 10 mole % to 40 mole % of the sum of polymerized units of one or more aliphatic diols where the mole % is the sum of the moles of polymerized units of the one or more aliphatic diols in the copolymer expressed as a percentage of the total moles of polymerized units that make up the copolymer;
(iii) a primary Tg between 85° C. and 125° C. as measured from the inflection point on second heatup of the DSC curve using a heating/cooling rate of 10° C./min; and
(iv) a heat of melting $\Delta H_m$ peak no greater than 10 J/g after exposure to hydrostatic pressure of 1000 psi $CO_2$ at 135° C. for 4 hours.

In another embodiment, the copolyester, co-polyesterpolycarbonate or co-polyesterpolyether copolymer has a B[X] or B[X+X'] value of 0.20 or greater, where B is the Koenig B value for copolymer randomness, [X] is the molar fraction of comonomer polyester structural units or of comonomer polycarbonate and/or polyether structural units, and [X+X'] is the molar fraction of comonomer polyester structural units or of comonomer polycarbonate and/or polyether structural units, including any units comprising residue fragments thereof, in the copolymer.

The invention also relates to a foamable composition comprising the copolyester, co-polyesterpolycarbonate or co-polyesterpolyether copolymer and one or more blowing agents.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
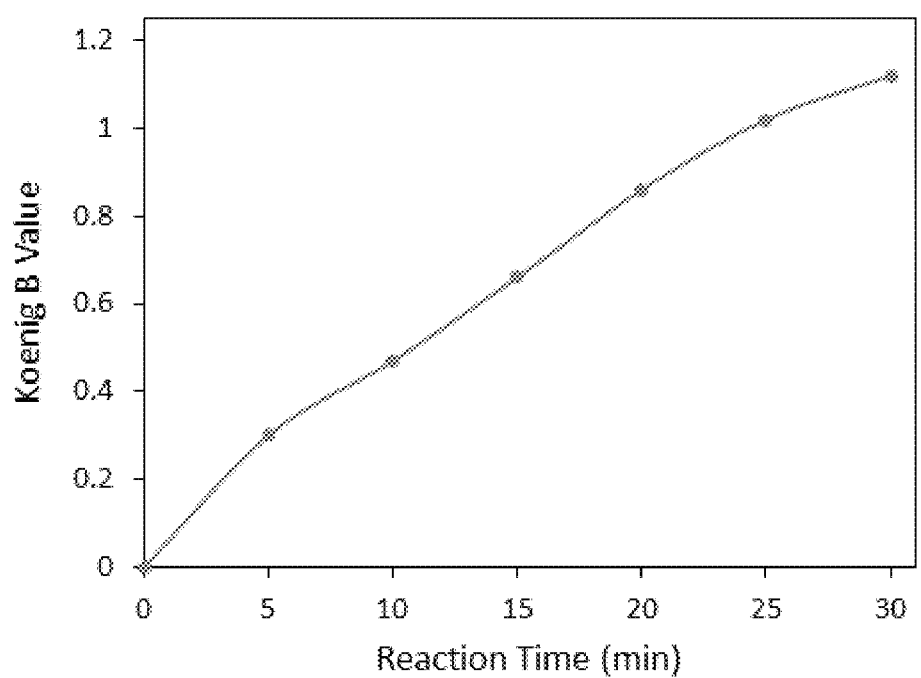
FIG. 1 shows the increase in Koenig B value for a monomer distribution in a polymer chain as a function of reaction time (in minutes) for a catalyzed transesterification reaction at 275° C. of a 75/25 blend (by weight) of virgin polyethylene terephtalate with virgin polycarbonate (Makrolon® 3158). The catalyst is monobutyltin oxide, MBTO (2,000 ppm—parts by weight of MBTO per million parts by weight of total weight of the two reactant polymers).

In the case of semi-crystalline PET, foaming must take place above the crystallization temperature of PET (~150° C.) where the polymer has very low melt strength and can be only minimally expanded before vitrification sets in. As disclosed herein, PET (virgin or recycled) is rendered into an amorphous form. The elimination of crystallization allows processing of the polymer below 150° C., where melt strength is inherently greater. This facilitates cellular expansion yielding a low density product. However, although the elimination of crystallinity in the polymer's neat form is required, it is not sufficient for foamability. Addition of one or more soluble blowing agent will increase crystallization rates. Accordingly, an additional challenge is to avoid polymer crystallization under certain pressures. It is further disclosed herein specifically what reduction in polymer block architecture is required to sufficiently reduce the crystallization rate in the presence of such blowing agents (such as, for example, $CO_2$). This is a required attribute for the polymer to be suitably foamable at temperatures below 150° C. in order to achieve densities less than 0.1 g/cm³.

Unlike semi-crystalline PET, which is known to have poor solubility of typical blowing agents, the inventive process modifies PET to yield an amorphous polymer with a higher solubility for typical blowing agents and allows for generation of low density foam articles. Preventing the formation of crystalline structure also increases gas permeability rates, which is advantageous for cellular growth during the foaming process.

Recycled PET is rendered useful for foaming through reduction or elimination of its ability to crystallize in the presence of heat and/or dissolved gas. This is accomplished through direct transesterification of molten PET with one or more other polymers in the presence of a catalyst to promote rearrangement and alteration of the repeat units contained within the polymers to form a new co-polyester (such as co-polyesterpolycarbonate or co-polyesterpolyether). The non-PET polymeric components do not have to be a polyester, and do not necessarily need to be amorphous. Intentional elimination of carbonyl and ethylene glycol species produces a copolyester or copolyesterpolyether backbone architecture with increased Tg. Through appropriate catalyst choice, temperature, and reaction time, the resulting polymer has a sufficiently slow crystallization rate. This reduction or elimination of crystallization allows processing at temperatures below 150° C. (the crystallization temperature of the starting PET material). The final co-polyester (or co-polyesterpolycarbonate or co-polyesterpolyether) can be melt blended with physical blowing agents and expanded via extrusion foaming or rapidly cooled for expansion in a separate process (expandable bead).

The present invention can be understood more readily by reference to the following detailed description, examples, drawings, and claims, and their previous and following description. However, it is to be understood that this invention is not limited to the specific compositions, articles, devices, systems, and/or methods disclosed unless otherwise specified, and as such, of course, can vary. While aspects of the present invention can be described and claimed in a particular statutory class, such as the composition of matter statutory class, this is for convenience only and one of skill in the art will understand that each aspect of the present invention can be described and claimed in any statutory class.

The following description of the invention is also provided as an enabling teaching of the invention in its best, currently known aspect. To this end, those of ordinary skill in the relevant art will recognize and appreciate that changes and modifications may be made to the various aspects of the invention described herein, while still obtaining the beneficial results of the present invention. It will also be apparent that some of the benefits of the present invention may be obtained by selecting some of the features of the present invention without utilizing other features. Accordingly, those of ordinary skill in the relevant art will recognize that many modifications and adaptations to the present invention are possible and may even be desirable in certain circumstances, and are thus also a part of the present invention.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading or in any portion of the disclosure may be combined with embodiments illustrated under the same or any other heading or other portion of the disclosure.

Any combination of the elements described herein in all possible variations thereof is encompassed by the invention unless otherwise indicated herein or otherwise clearly contradicted by context.

Unless otherwise expressly stated, it is in no way intended that any method or aspect set forth herein be construed as requiring that its steps be performed in a specific order. Accordingly, where a method claim does not specifically state in the claims or description that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification. It is to be understood that both the foregoing general description and the following detailed description are exemplary and explanatory only and are not restrictive.

All publications mentioned herein are incorporated herein by reference to disclose and describe the methods and/or materials in connection with which the publications are cited.

It is to be understood that the terminology used herein is for the purpose of describing particular aspects only and is not intended to be limiting. Unless defined otherwise, all technical and scientific terms used herein have the same meaning as commonly understood by one of ordinary skill in the art to which this invention belongs. In this specification and in the claims which follow, reference will be made to a number of terms which are defined herein.

As used in the specification and the appended claims, the singular forms "a," "an" and "the" include plural referents unless the context clearly dictates otherwise.

As used herein, the term "and/or" means "and, or as an alternative".

As used herein, the terms "optional" or "optionally" mean that the subsequently described event, condition, component, or circumstance may or may not occur, and that the description includes instances where said event, condition, component, or circumstance occurs and instances where it does not.

As used herein, the phrase "sufficient to" (e.g., "conditions sufficient to") refers to such a value or a condition that is capable of performing the function or property for which a sufficient value or condition is expressed. As will be pointed out below, the exact value or particular condition required may vary from one embodiment to another, depending on recognized variables, such as the materials employed and/or the processing conditions.

The term "by weight," when used in conjunction with a component, unless specifically stated to the contrary, is based on the total weight of the formulation or composition in which the component is included. For example, if a particular element or component in a composition or article is said to be present in an amount of 8% by weight, it is understood that this percentage is in relation to a total compositional percentage of 100% (and may, accordingly, be written as 8 wt. %). In some instances, the weight percent of a component is based on the total weight of the composition "on a dry basis," which indicates the weight of the composition without water (e.g., less than about 1%, less than about 0.5%, less than about 0.1%, less than about 0.05%, or about 0% of water by weight, based on the total weight of the composition).

When disclosing numerical values herein, for example, 1, 2, 3, 4, 5, 6, 7, 8, 9, 10, the following sentence typically follows such numerical values: "Each of the foregoing numbers can be preceded by the term 'about,' at least about,' or 'less than about,' and any of the foregoing numbers can be used singly to describe an open-ended range or in combination to describe a close-ended range." This sentence means that each of the aforementioned numbers can be used alone (e.g., 4), can be prefaced with the word "about" (e.g., about 8), prefaced with the phrase "at least about" (e.g., at least about 2), prefaced with the phrase "less than about" (e.g., less than about 7), or used in any combination with or without any of the prefatory words or phrases to define a range (e.g., 2 to 9, about 1 to 4, 8 to about 9, about 1 to about 10, and so on). Moreover, when a range is described as "about X or less," this phrase is the same as a range that is a combination of "about X" and "less than about X" in the alternative. For example, "about 10 or less" is the same as "about 10, or less than about 10." Such interchangeable range descriptions are contemplated herein. Other range formats are disclosed herein, but the difference in formats should not be construed to imply that there is a difference in substance.

The use of numerical values in the various quantitative values specified in this application, unless expressly indicated otherwise, are stated as approximations as though the minimum and maximum values within the stated ranges were both preceded by the word "about." In this manner, slight variations from a stated value may be used to achieve substantially the same results as the stated value. Also, the disclosure of ranges is intended as a continuous range including every value between the minimum and maximum values recited as well as any ranges that may be formed by such values. Also disclosed herein are any and all ratios (and ranges of any such ratios) that may be formed by dividing a recited numeric value into any other recited numeric value. Accordingly, the skilled person will appreciate that many such ratios, ranges, and ranges of ratios may be unambiguously derived from the numerical values presented herein and in all instances such ratios, ranges, and ranges of ratios represent various embodiments of the present invention.

As used herein, the term "substantially free of" refers to a composition having less than about 1% by weight, e.g., less than about 0.5% by weight, less than about 0.1% by weight, less than about 0.05% by weight, or less than about 0.01% by weight of the stated material, based on the total weight of the composition.

As used herein, the term "substantially," when used in reference to a composition, refers to at least about 60% by weight, e.g., at least about 70%, at least about 80%, at least about 90%, at least about 95%, at least about 98%, at least about 99%, or about 100% by weight, based on the total weight of the composition, of a specified feature or component.

The term "polyester" herein designates polymers of which the repeat units are characterized by an ester group. The term therefore comprises not only homopolymers, i.e. polyesters composed of one acid component and of one alcohol component, or of one hydroxycarboxylic acid component, or one lactone component, but also copolymers, i.e. polyesters ("copolyesters") composed of at least two acid components and/or alcohol components, and/or hydroxycarboxylic acid components and/or lactone components. The term "copolyesters" is a subset of polyesters. In the event a copolymer results from the transesterification reaction of two different polyester polymers, the resulting copolymer is herein referred to as a "copolyester" copolymer, or a "mixed copolyester" to differentiate the generic term copolyester when also referring to co-polyesterpolycarbonates or co-polyesterpolyethers. In the event that a copolymer results from the transesterification reaction of a polyester polymer and a polycarbonate polymer, the resulting copolymer (copolyester) is herein termed a "co-polyesterpolycarbonate" copolymer. The term "co-polyesterpolycarbonate" is a subset of copolyesters. It is to be understood that under some reaction conditions such polymers may undergo loss of $CO_2$ units, such that the resulting functionality is an ether unit (resulting from loss of $CO_2$ from the carbonate unit). In the event that 100% (or nearly 100%, such as, for example, 99.5%, or 99%, or 95%) of the possible carbonate functionality is converted to an ether functionality, then the resulting polymer is referred to herein as a "co-polyesterpolyether" (the term "co-polyesterpolyether" is a subset of copolyesters). Otherwise (i.e. less than 95%, or less than 99%, or less than 99.5% of the possible carbonate functionality is converted to an ether functionality), the copolymer is still referred to as a co-polyesterpolycarbonate.

Polyesters may be obtained from conventional synthesis means using dicarboxylic acids and difunctional alcohols. Aromatic dicarboxylic acids are preferred. Examples of suitable dicarboxylic acids include phthalic acid, isophthalic acid, terephthalic acid, and 2,5-furandicarboxylic acid (FDCA). Examples of suitable difunctional alcohols (diols) that can be combined with any of these dicarboxylic acids include ethylene glycol, propanediol (including propylene glycol), butanediol (butylene glycol), cyclohexane dimethanol, isosorbide, and spiroglycol. For example, poly(ethylene terephthalate), PET, can be synthesized using ethylene glycol and terephthalic acid; and poly(ethylene furanoate), PEF, can be synthesized using ethylene glycol and 2,5-furandicarboxylic acid.

Co-polyesters may be obtained, for example, by the transesterification reaction of two or more different polyester polymers, as discussed further herein.

Polycarbonate polymers include those obtainable from the reaction of polyfunctional alcohols (for example, diols, including those disclosed above, as well as bisphenol A, BPA) with carbon acid derivatives, such as, for example, diphenyl carbonate, dimethyl carbonate, ethylene carbonate or phosgene. For example, the polymer most commonly referred to as polycarbonate can be synthesized by reaction of phosgene (or dimethyl carbonate) and BPA.

Co-polyesterpolycarbonates and co-polyesterpolyethers (at least formally derived from co-polyesterpolycarbonates) may be obtained, for example, by the transesterification reaction of one or more polyester polymer with one or more polycarbonate polymer, as discussed further herein. As discussed earlier, elimination of $CO_2$ from the co-polyesterpolycarbonate copolymer can result in formation of co-polyesterpolyether copolymer. Such side reaction may or may not occur at every possible structural group unit along the polymer chain.

Herein, the term "structural unit" is used with its normal meaning in the art. In polymer chemistry, a structural unit is a building block of a polymer chain. It is the result of a monomer that has been polymerized into a long chain (polymer). There may be more than one structural unit in the repeat unit. When different monomers are polymerized, a copolymer is formed. In the case of polyethylene terephthalate (PET), the monomers normally used to make this polymer are ethylene glycol (HO—$CH_2$—$CH_2$—OH) and terephthalic acid (HOOC—$C_6H_4$—COOH). In the polymer, there are two structural units, which are —O—$CH_2$—$CH_2$—O— and —OC—$C_6H_4$—CO—. The repeat unit is: —$CH_2$—$CH_2$—O—CO—$C_6H_4$—CO—O—. Further, as used herein, the term "structural unit" can refer to a repeat segment comprising two monomeric units in polymerized form that is a repeat unit within the polymer. For example, in the transesterification reaction of a polyester, such as PET, and a polycarbonate (PC), some repeat units in the product may be two-monomer segments that result from the original constituent polymers, such as, for example, the polyester repeat unit —$CH_2$—$CH_2$—O—CO—$C_6H_4$—CO—O— as well as other repeat segments, and these segments can be viewed as structural units, where the difference between a monomeric structural unit and a two-monomer structural unit is clarified or obvious from the context. For example, a polyester two-monomer segment is a structural unit, and a polycarbonate two-monomer segment is a structural unit. Structural units can be identified and quantified by techniques such as nuclear magnetic resonance spectroscopy (NMR), as discussed further herein.

Certain polymerization reactions, or certain polymers undergoing a reaction, may involve a side reaction that alters the structural unit (X) compared to that which is expected from the monomer or polymerized monomer unit. In the event the altered unit loses a portion of its structure, for example, a $CO_2$ molecule from a polycarbonate unit, the remaining portion is referred to as a residual fragment or residue (X'). Such species may still be identified by NMR, and may be included quantitatively in the count of structural units in the polymer by considering all units derived from the expected structural unit X to now be present in the polymer as a combination of X and X' (i.e. X+X'). Therefore [X+X'] is the mole fraction of the structural unit X and the residue thereof, X'.

The glass transition temperature of a polymer, Tg, is measured using Differential Scanning calorimetry (DSC) and determined as the inflection point of the baseline step transition on the second heating of the sample (heating/cooling rate of 10° C./min), and is reported in degrees Celsius. (see Example 4).

The enthalpy of melting or crystallization, $\Delta Hm$, were measured by DSC using a linear baseline estimation for the area of the peak, and is reported as J/g (measured as the linear integration of the peak area as deviation from the baseline, starting at 125° C. and ending at 250° C.). Analysis of samples prior to exposure to hydrostatic pressure of $CO_2$ was conducted on the second ramp of temperature. This is referred to herein as the "$\Delta Hm$ before foaming" when performed on the copolyester copolymer prior to exposure to a blowing agent, such as $CO_2$. Considering that the enthalpy of crystallization for crystalline PET is 140 J/g, one can estimate that an enthalpy of crystallization less than 10 J/g would represent approximately 7% crystallinity or less, and an enthalpy of crystallization less than 5 J/g would represent a crystallinity of under 4%.

To assess $\Delta H_m$ after exposure to hydrostatic pressure of $CO_2$, referred to herein as "$\Delta Hm$ after foaming", a sample was compression molded into a 1.3 mm thick film (25 tons of pressure at 180° C. for 5 minutes) and placed in a pressure vessel. The vessel was heated to 135° C. and approximately 1000 psi of carbon dioxide blowing agent was loaded into the headspace to soak the sample for 4 hour. The pressure was then rapidly released to induce foaming in the sample. Differential Scanning calorimetry was then used to obtain the enthalpy of melting or crystallization, "$\Delta Hm$ after foaming", (as described above and in Example 4), except that analysis of samples after exposure to hydrostatic pressure of $CO_2$ was conducted on the first ramp of temperature.

As used herein, the term "foam" means a light frothy mass of fine bubbles formed in or on the surface of a liquid or from a liquid. Herein, depending on context, the term can be referring to the wet foam prior to drying, or it can be used to describe the dry foam. With respect to determining whether a sample could be successfully foamed (a "foamable resin" or a "foamable copolymer"), the molten sample must be frothed and be capable of forming a stable foam. In general terms, and in the end uses considered herein, a barely adequate foam would result from a volume expansion of at least 3.5 times, up to an 8 times volume expansion. A 'good' foam would result from a volume expansion of 8-11.5 times. A preferred foam would be at least 11.5 times volume expansion, more preferably at least 16 times volume expansion. Volume expansion is calculated by dividing the density of the solid polymer (for example, in the case of PET, 1.27 g/cm$^3$) by the density of the foam. The density of the foam is measured using the buoyancy method: weighing the sample in air (grams of foam sample) and weighing the buoyancy force of the sample when under water at room temperature (weight of water displaced is equal to the volume of water displaced since water has a density of 1 g/cm$^3$—which in turn is the volume of the foam sample, in cm$^3$, assuming no water absorption. The density of the foam, g/cm$^3$, is then calculated as the weight of the foam sample in air divided by the volume of the foam sample). The foams described herein meet these targets for volume expansion.

As used herein, "stable foam" refers to a foam that is stable with respect to observable shrinking or collapse during the drying process and beyond in the absence of any external force other than the surrounding atmosphere.

As used herein, the term "rigid foam" refers to a dried foam that has a cellular structure with a compressive strength greater than 5 psi.

As used herein, "ambient cure conditions" refers to the range of conditions typically experienced in unconditioned, outdoor spaces and under which a sprayed or aerosol-dispensed foam product could be dispensed and dried. This excludes environments that include any form of forced convection and/or heating.

All molecular weights and other values associated with molecular weights disclosed herein are measured by GPC.

As used herein, Gel Permeation Chromatography (GPC) refers to a chromatographic separation method in which molecules in solution are separated by their size. The separation is achieved by the differential exclusion of the sample molecules as they pass through a bed of porous particles, known as a separation column. GPC may be used to determine a substantially accurate molar mass distribution of polymer molecules. For example, the liquid fraction (an eluent) passing though the column is collected in constant volumes. As the polymer elutes through the column, molecules that are too large to penetrate the column pores are excluded from the packing pore volume and elute at earlier retention times, whereas the smaller molecules penetrate into the column pores and elute at a later time. The concentration of eluted polymers may be measured by spectroscopic techniques, such as, for example, refractive index (RI) and ultraviolet (UV). The eluent flow may also be analyzed continuously with RI, Low-Angle Laser Light Scattering (LALLS), Multi-Angle Laser Light Scattering (MALLS), UV, and/or viscosity measurements.

As used herein, the terms "molar mass distribution," "MMD," and "molecular weight distribution" are used interchangeably and describe the relationship between the number of moles of each polymer species or a number of polymer chains (Ni), and the molar mass (MO) of that species or polymer chain. The molar mass distribution of a polymer may be modified by polymer fractionation. Different average values may be defined depending on the statistical method that is applied and are described herein.

As used herein, the term "number average molecular weight" ($M_n$, or $\overline{M}_n$) refers to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ may be determined for polymers by methods well known to a person having ordinary skill in the art using molecular weight standards, e.g., polystyrene standards, preferably certified or traceable molecular weight standards.

As used herein, the term "weight-average molecular weight" ($M_w$, or $\overline{M}_w$) is defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight-average. Thus, the greater the molecular weight of a given chain, the more the chain contributes to the $M_w$. $M_w$ may be determined for polymers by methods well known to a person having ordinary skill in the art using molecular weight standards, e.g., polystyrene standards, preferably certified or traceable molecular weight standards. The $M_w$ for foaming the polyester copolymers described herein should be at least 10,000.

Since a copolymer consists of at least two types of structural (or monomer/monomer residue) units, copolymers can be classified based on how these units are randomly arranged along the chain. One index to characterize the monomer distribution along a copolymer chain is "Koenig B-value" (B), which is defined by the formula for a binary copolymer (see, for example, EP 2,736,930 B1 to L. Tau et al.):

$$B = \frac{[XY]+[YX]}{2[X][Y]} \quad (1)$$

where X and Y are the two structural units of the copolymer; [X] and [Y] are their corresponding molar fractions ([X]+[Y]=1); [XY] and [YX] are the molar fractions of XY and YX diads. Two adjacent structural units in a polymer molecule constitute a diad. For the above binary copolymer, there are four types of diads XX, XY, YX, YY with [XX]+[XY]+[YX]+[YY]=1. Index B significantly affects many physical properties of a copolymer, including morphology, crystallization, glass transition, solubility, mechanical properties, and others.

NMR-based methods can be used to determine the copolymer composition and the exact monomer sequencing in the copolymer, as well as calculate the index B, which describes the blockiness (actually, reduced level of blockiness) of the copolymer generated by the catalyzed transesterification process. This B value has been shown to vary with processing conditions such as temperature, time, and catalyst type, as well as the level of comonomer, such as polycarbonate, in the blend formulation. For example, FIG. 1 shows the variation in copolymer Koenig B value (monomer distribution value or disruption of blockiness) as a function of reaction time for a catalyzed transesterification reaction of polyethylene terephthalate (PET, monomer structural units, Y) and polycarbonate (PC, monomer structural units, X) performed at 275° C. B values were obtained using the method described herein. Additionally, this method can be used to differentiate the foamable copolymer compositions described herein from those of the prior art.

The Koenig B value for monomer distribution in a polymer can be described as such where X represents the comonomer (such as polycarbonate) repeat units and Y represents polyester monomer (such as PET) repeat units: A minimum value of (close to) B=0 means the copolymer composition exists as a diblock polymer sequence (non-zero because the diblock must have 1 XY or YX diad):
XXXXXXXYYYYYYYYYYYYYYYYYYYYYYYYYYYY A value of B=1 indicates a random copolymer (or "statistical copolymer"), such as, for example:
XYYYYYYYYXXXYYYYYYYYYYXYYYYYYXXYYY A maximum value of B, $B_{max}=1/[Y]$ represents a perfectly alternating copolymer (Every X (minor component) is surrounded by a Y (major component); there are no X blocks or XX diads in the polymer chain),
XYYYYYYXYYYXYYYYYYXYYXYYYYYXYYYX YY where [Y] is the molar fraction of polyester monomer units (for example, $B_{max}$=1.25 when X:Y=1:4 or 20:80. That is, the molar fraction of X is 0.2 and the molar fraction of Y is 0.8; 1/0.8=1.25).

The highest possible $B_{max}$ occurs for a 50/50 molar ratio binary copolymer comprising two perfectly alternating monomers, X and Y ([X]=[Y]=0.5), for which only the XY and YX diads exist (in equal amounts) and therefore [XY]=[YX]=0.5
XYXYXYXYXYXYXYXYXYXYXYXYXYXYXYX YX From equation 1:

$$B=([XY]+[YX])/(2[X][Y])=(0.5+0.5)/(2*[0.5]*[0.5])\\=1/0.5=2$$

And:

$$B_{max}=1/[Y]=1/0.5=2$$

Figure 2:
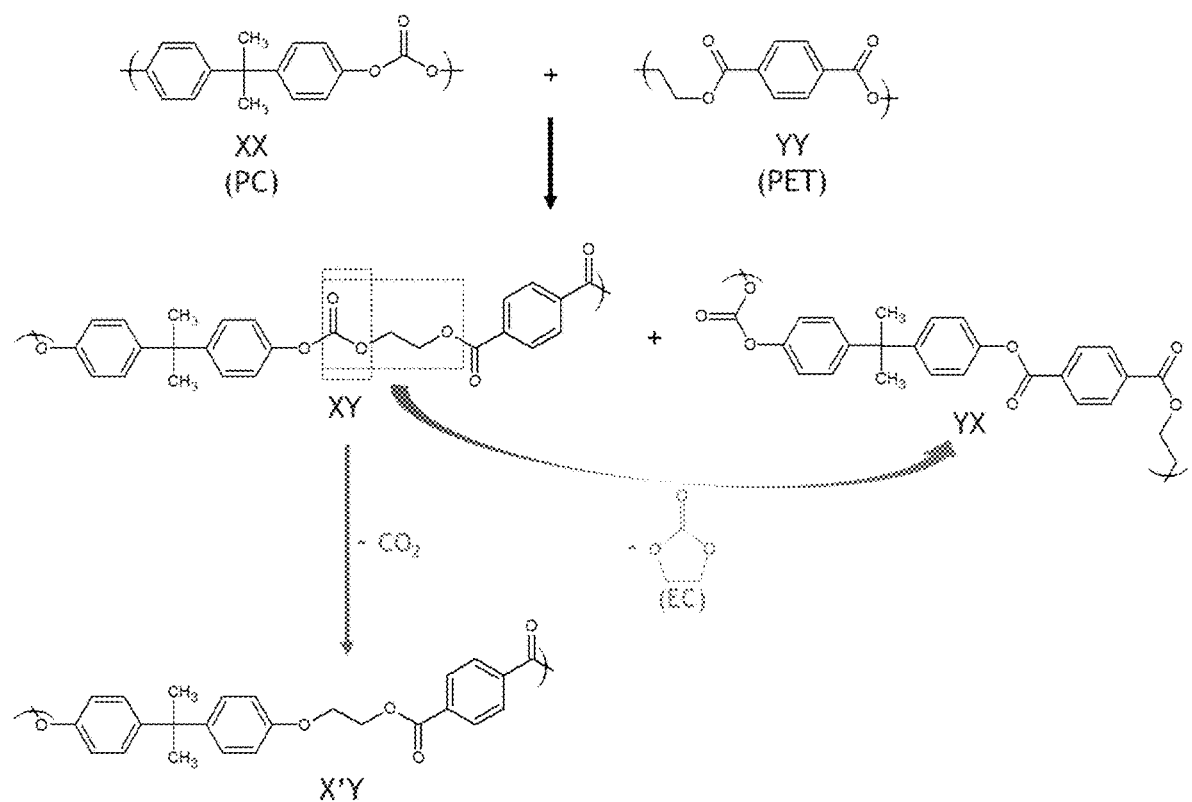
FIG. 2 shows the transesterification reaction between polycarbonate (PC) and polyethylene terephthalate (PET), and two side reactions.

For co-polyesterpolycarbonate made from the transesterification reaction of a polyester polymer (PET) and a polycarbonate polymer (PC), the resulting copolymer (PC/PET) is not an ideal binary copolymer due to the side reactions (such as loss of $CO_2$ from the carbonate unit). The definition of index B is modified to accommodate the side reactions while retaining the same physical meaning as above. The new definition is illustrated using the example of PC/PET transesterification (FIG. 2).

$$B = \frac{[XY] + [X'Y] + [YX]}{2[X + X'][Y]} \quad (2)$$

where X and Y are the two structural units of the copolymer (BPA carbonate comonomer and ethylene terephthalate monomer, respectively). Because of the two side reactions, five diads are detected by $^{13}C$ NMR: XX, XY, X'Y, YX, YY. The extra diad X'Y (ether bonding) is introduced by the loss of $CO_2$. From the perspective of $^{13}C$, specifically the carbon atoms tracked as described below, the other side reaction (loss of ethylene carbonate) only changes the core adjoining XY diad to a core adjoining fragment identical to that of a YX diad, and thus does not introduce a new diad. The square brackets indicate molar fractions of the structural units or diads, and they meet the conditions: [X']+[X]+[Y]=1 and [XX]+[XY]+[X'Y]+[YX]+[YY]=1.

Figure 3:
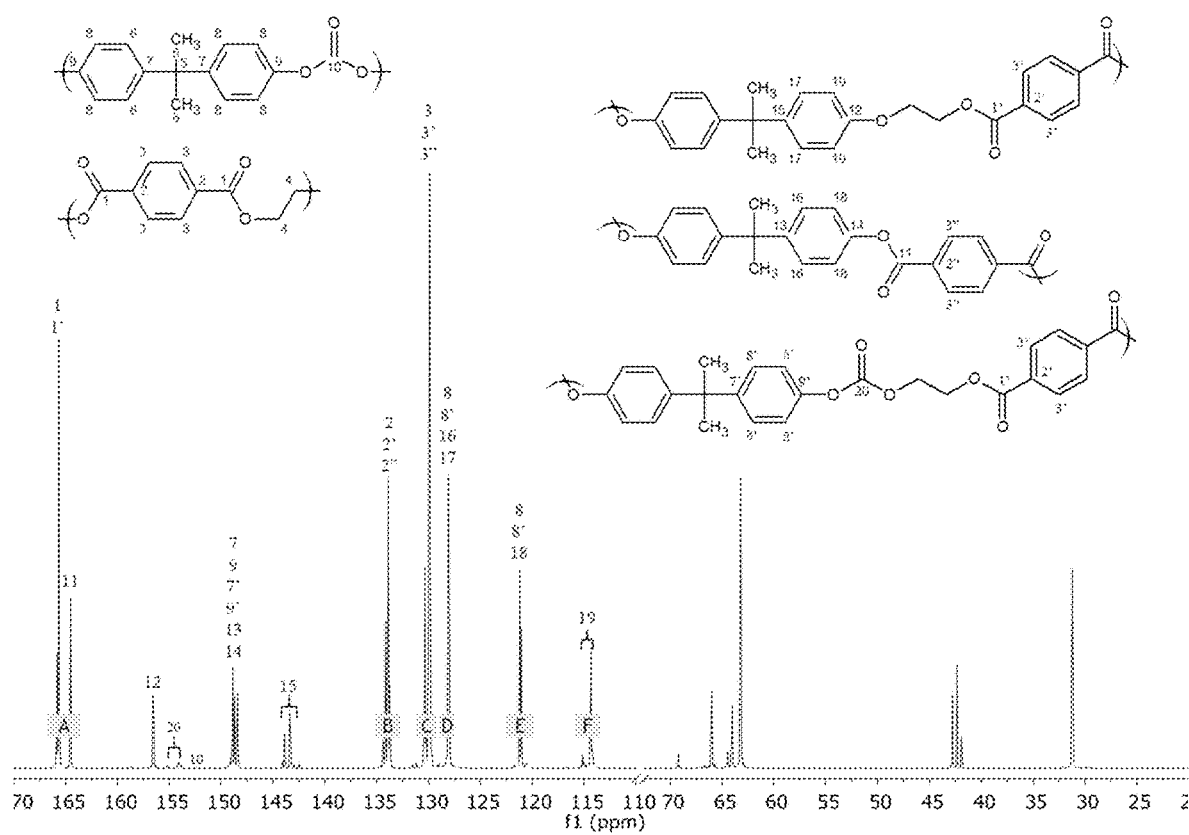
FIG. 3 shows a representative quantitative $^{13}$C NMR spectrum of PC/PET copolymer and peak assignments. The numeric labels are assignments for each individual carbon. The letter labels superimposed on NMR resonance peaks designate integration regions to calculate the molar fractions of structural units (overall copolymer composition).

FIG. 3 shows a representative quantitative $^{13}C$ NMR spectrum of PC/PET copolymer and detailed peak assignments. Because of the quantitative nature of the NMR spectrum, the peak intensity (I) is strictly proportional to the number of observed structural units or diads.

In considering the comonomer units that are derived from the PC units X and X', the total amount of PC comonomer units is denoted as $N_{X+X'}$. In FIG. 3, the carbon assignments 8, 8', 16, 17, 18 and 19 are unique to the PC fragment (either X or X') and account for 8 carbons of the core PC fragment (the 8 carbons from the two phenyl rings where those 8 carbons are bonded only to 2 other phenyl ring carbon atoms and a phenyl ring hydrogen atom). These carbons are all assigned to the $^{13}C$ NMR peaks labelled D, E and F in FIG. 3, and the $^{13}C$ NMR peaks have peak intensities $I_D$, $I_E$ and $I_F$, respectively. Accordingly, the total amount of PC comonomer units $N_{X+X'} = (I_D + I_E + I_F)/8$ Similarly, in considering the comonomer units that are derived from the PET units Y, the total amount of PET units is denoted as $N_Y$. In FIG. 3, the carbon assignments 1 (or 1' or 11), 2 (or 2' or 2") and 3 (or 3' or 3") are unique to the PET fragment Y and account for 8 carbons of the core PET fragment (the 6 phenyl carbons and the two carbonyl carbons attached to the phenyl ring). These carbons are all assigned to the $^{13}C$ NMR peaks labelled A, B and C in FIG. 3, and the $^{13}C$ NMR peaks have peak intensities $I_A$, $I_B$ and $I_C$, respectively. Accordingly, the total amount of PET monomer units $N_Y = (I_A + I_B + I_C)/8$ From the expressions for $N_{X+X'}$ and $N_Y$, the molar fraction of PC and PET can be calculated:

$$[X + X'] = \frac{N_{X+X'}}{N_{X+X'} + N_Y} = \frac{I_D + I_E + I_F}{I_A + I_B + I_C + I_D + I_E + I_F} \quad (3)$$

$$[Y] = \frac{N_Y}{N_{X+X'} + N_Y} = \frac{I_A + I_B + I_C}{I_A + I_B + I_C + I_D + I_E + I_F} \quad (4)$$

Similar to above, the XY diad has a single unique $^{13}C$ NMR carbon resonance assigned to carbon 20 in FIG. 3 (with peak intensity $I_{20}$), and represents just one carbon atom in the XY diad.

The amount of XY diad $N_{XY} = I_{20}$

The carbon assignments 12, 15 and 19 are unique to the X'Y fragment and represent 4 carbons in that fragment.

The amount of X'Y diad $N_{X'Y} = (I_{12} + I_{15} + I_{19})/4$

The amount of YX diad $N_{YX} = I_{11}$

The XX diad has a single unique $^{13}C$ NMR carbon resonance assigned to carbon 10 in FIG. 3 (with peak intensity $I_{10}$), and represents just one carbon atom in the XX diad. Accordingly, the amount of XX diad $N_{XX} = I_{10}$ The amount of YY diad $N_{YY} = N_Y - (N_{XY} + N_{X'Y} + N_{YX})/2 = (I_A + I_B + I_C - 4*I_{20} - I_{12} - I_{15} - I_{19} - 4*I_{11})/8$ From the expressions for $N_{XY}$, $N_{X'Y}$ and $N_{YX}$, the molar fractions of diads can be calculated:

$$[XY] = \frac{N_{XY}}{N_{XX} + N_{XY} + N_{X'Y} + N_{YX} + N_{YY}} \quad (5)$$

$$[X'Y] = \frac{N_{X'Y}}{N_{XX} + N_{XY} + N_{X'Y} + N_{YX} + N_{YY}} \quad (6)$$

$$[YX] = \frac{N_{YX}}{N_{XX} + N_{XY} + N_{X'Y} + N_{YX} + N_{YY}} \quad (7)$$

By substituting the molar fractions from equations (3)-(7) into equation (2), the B value of this copolymer can be calculated (equations 5, 6, 7 give the components of the numerator of equation 2; and equations 3 and 4 give the components of the denominator of equation 2).

For copolyesters comprising 75% PET by weight, a resin with a B value greater than 0.88, preferably greater than 0.90, will produce a foamed article when imbibed with $CO_2$ as a blowing agent. A number of trans-esterified PET/PC resin samples have been generated using batch Haake mixing bowl experiments and continuous Pilot Line runs, resulting in B values of about 0.36 when no catalyst was used for copolyesters comprising 75% PET by weight (see, for example, Table 3), and ranging from 0.51 up to 1.25 for the same system when a catalyst was used (Table 3).

The B value only characterizes how random (or blocky) a comonomer is distributed along a copolymer chain. The block length distribution, which dominates the copolymer foamability, is affected by both B and copolymer composition. Using the B definition in equation (2), B [X+X'] is a universal index to characterize the foamability of PC/PET copolymers, where [X+X'] is the molar fraction of PC comonomer and residue in the copolymer. Regardless of composition, typically a resin with B[X+X'] greater than 0.18, preferably greater than 0.20, and more preferably greater than 0.22, will produce a foamed article when imbibed with $CO_2$ as a blowing agent (see the examples of copolymers at four different compositions in Table 1).

In certain embodiments, the invention described herein relates to: A copolyester, co-polyesterpolycarbonate or co-polyesterpolyether comprising either differing polyester units, or comprising polyester units and polycarbonate or polyether units or both, and optionally further comprising one or more coupling agents, and being characterized by having (i) polymerized units of one or more aromatic diacid monomer; (ii) from 10 mole % to 40 mole % of the sum of polymerized units of ethylene glycol, propylene glycol, butylene glycol, cyclohexane dimethanol, isosorbide, or spiroglycol, or combination thereof; (iii) a Tg between 85 and 125° C. as measured from the inflection point on second heatup of the DSC curve using a heating/cooling rate of 10°

C./min; and (iv) a heat of melting, $\Delta H_m$, peak no greater than 10 J/g after exposure to hydrostatic pressure of 1000 psi $CO_2$ at 135° C. for 4 hours.

As discussed earlier, crystalline and semicrystalline polyester polymers cannot be readily foamed to produce a low density foam and high temperatures are required to keep the material from re-crystallizing while gases expand to produce the foam. The approach discussed herein reduces or removes the crystallinity of the polymer by disrupting the consecutive repeat polyester structural units. Because there is no crystallization to overcome, the amorphous copolyester can be foamed at lower temperatures (above the glass transition temperature) where melt strength is reasonable. Disclosed herein is a method to convert semicrystalline PET (optionally, a portion or all of which may be recycled PET) directly to an amorphous copolyester, such as, for example, a mixed polyester copolyester, a copolyesterpolycarbonate or a copolyesterpolyether, and also disclosed are compositions to create the foamable copolyester polymer.

There is disclosed herein a method of forming the foamable copolyester, co-polyesterpolycarbonate or co-polyesterpolyether described herein, the method comprising: (i) melting a blend of at least two polymers selected from a first polyester polymer and one or more other polymer selected from one or more polycarbonate polymer and one or more other polyester polymer, or combination thereof, and in the presence of a transesterification catalyst, and, optionally, a chain coupling agent; (ii) maintaining a temperature greater than 200° C. for at least 3 minutes, optionally with mixing; (iii) optionally, collecting at least a portion of any ethylene carbonate produced; and (iv) cooling to produce a solid copolymer.

The starting polyester, or one of the starting polyesters, may be polyethylene terephthalate (PET). The starting polyethylene terephthalate (PET) may be commercially available, such as, for example, Certene® 8080, from Muehlstein (a subsidiary of Ravago, Arendonk, Belgium); or may be sourced as solid recycled polyester, such as recycled PET for example, from Reterra Plastics (Reterra Corporation, Houston, Tex., USA), PolyQuest Inc. (Darlington, S.C., USA), Circular Polymers (Lincoln, Calif., USA), or Evergreen Plastics (Clyde, Ohio, USA). Alternatively, the starting polyester(s) may be synthesized by methods well-known in the art (see above). Glycol modified polyesters (PETG) or other polyesters (such as polypropylene terephthalate (usually called PTT or polytrimethylene terephthalate), polybutylene terephthalate, polycyclohexane dimethanol terephthalate, polyspyroglycol terephthalate, polyisosorbide terephthalate, polyethylene furanoate (PEF), polytrimethylene furanoate (PTF), or other furanoate-based polyesters) can be used in partial or full replacement of the semicrystalline PET. Similarly, polycarbonate polymers may be commercially available, for example, Makrolon® 3158 from Covestro AG (Leverkusen, Germany); or CALIBRE® 1060 DVD or CALIBRE® 1080 DVD from Trinseo, LLC (Berwyn, Pa., USA); or 17-22 MF (Premier Plastic Resins), or may be sourced as solid recycled polycarbonate for example, from Star Plastics, Inc. (Ravenswood, W. Va., USA) or Opticarb PC from The Materials Group (Rockford, Mich., USA); or, alternatively, may be synthesized by known methods. High Tg polyester (such as Tritan® GX100 or FX200, from Eastman Chemical, Kingsport, Tenn.) can be used in partial or full replacement of polycarbonate.

The polyester, such as poly(ethylene terephthalate), is melted to a temperature above its crystalline melting temperature and blended with a polycarbonate (preferably an aromatic polycarbonate, such as, for example, bisphenol A polycarbonate) or other polyester plus optional third polymer (which may be a polyester or polycarbonate type polymer). Optionally, chain coupling agents may be added, such as, for example, pyromellitic dianhydride, 3-(trimethoxysilyl)propylmethacrylate, or others known in the art. The transesterification catalyst is added to the melt blend either as a physical blend with the solid or molten polymer, or as a concentrate in one of the polymers. As described herein, the polymers are conveniently mixed and reacted in the melt phase, which also lends itself to extrusion processing which is already prevalent in the art (for example in the production of foam insulation boards). The mixing and reacting may alternatively occur in solution, although there are few solvents that form good solutions for these polymers and most are considered to be environmentally unacceptable solvents. Such solvents (and partial solvents) may include, but are not limited to, a 60/40 blend of phenol/1,1,2,2-tetrachloroethane, fluorinated alcohols, such as hexafluoroisopropanol, trifluoroacetic acid, orthochlorophenol, meta-cresol, chloroform and methylene chloride.

The inventors have found that in the absence of a catalyst, the polymers are not sufficiently transesterified to generate a new copolymer that does not crystallize when blowing agent is dissolved within. Accordingly, when polyester polymers (or polyester and polycarbonate polymers) are simply blended in the absence of a catalyst ("polymer mix", "polymer blend" or "mixed composition"), the result is either a blend of the starting polymers or polymers that possess significant "blockiness" and cannot be used to create stable foams.

Suitable catalysts for the transesterification reaction include those known in the art, particularly organometallic complexes such as, for example, titanium(IV) tetrabutoxide, $Ti(OBu)_4$, titanium(IV) tetraisopropoxide, $Ti(O^iPr)_4$, cerium (III) acetate, $Ce(OAc)_3$, ytterbium(III) acetoacetonate, $Yb(acac)_3$, and calcium(II) acetate in conjunction with antimony(III) oxide $Ca(OAc)_2/Sb_2O_3$, as well as tin organometallic complexes such as monobutyl tin oxide (MBTO), dibutyl tin oxide (DBTO), dioctyl tin oxide (DOTO), some of which are available under the tradename FASCAT® Catalysts (PMC Organometallix, Mount Laurel, N.J., USA). Suitable levels of use may vary from one catalyst to the next, but generally are in the range of from 50 ppm to 10,000 ppm, or from 1,000 ppm to 5,000 ppm, or from 1,500 ppm to 3,000 ppm (parts of catalyst, by weight, per million parts of total polymers present in the reaction, by weight).

In certain embodiments, and as readily understood by one of ordinary skill in the art, the methods described herein may be performed in any reactor known in the art that is capable of withstanding the method's conditions. For example, and without limitation, the reactor may comprise one vessel or more than one vessel. The polymer components are mixed to disperse the minor phase significantly and promote transesterification. In an embodiment, and as described in Example 1, the components are mixed in the melt phase in a Haake Blender (for example, a Thermo-Scientific Haake Melt Rheometer). In another embodiment, and as described in Example 2, the components are mixed in the melt phase in an extruder apparatus, such as a twin screw extruder. Optionally, other desired additives may be added to the Haake blend or extruder blend and mixed in with the melt phase polymers, or, preferably, they are added later. Such other additives, in any combination, may include, for example, pigments, clays, colorants, lubricants, acid scavengers, infra-red attenuators, nucleating agents, flame retardant agents, and/or fillers/agents to increase gas permeability. The polymer blend (with any additives) is given approximately 1-5 minutes at 200-280° C. prior to quench cooling and pelletizing.

The transesterification reaction can proceed without the use of elevated pressures, although elevated pressures may be used (with similar effect to increasing temperature). Practical considerations may impact the specific choice of time and temperature conditions for the transesterification reaction, with lower temperatures requiring longer timeframes to effect the required extent of reaction to sufficiently minimize the amount of "blockiness" in the resulting copolyester to allow foaming of the copolyester product (see, for example, FIG. 1). In certain embodiments, the transesterification reaction can be performed at a temperature (° C.) of 150, 160, 170, 180, 190, 200, 205, 210, 215, 220, 225, 230, 235, 240, 245, 250, 255, 260, 265, 270, 275, 280, 285, 290, 295, 300, 310, 320, 330 or 350. The time (minutes) can be 0.5, 1, 2, 3, 4, 5, 10, 20, 30, 40, 50, 60, 70, 80, 90, 100, 110, 120, 130, 140, or 150, or longer. Each of the foregoing numbers (for temperature or time) can be preceded by the word "about," "at least about," or "less than about," and any of the foregoing numbers can be used singly to describe an open-ended range or in combination to describe a closed-ended range. Suitable reaction temperatures and times may be from 200° C. to 300° C. for 5 mins to 60 mins. Preferred reaction conditions (with the use of a catalyst) are from 230° C. to 275° C. for 5 mins to 30 mins (using an initial time of approximately 2 mins at 275° C. to ensure that the PET is in the melt phase).

Although side chemistry products ($CO_2$, ethylene glycol, and ethylene carbonate) are discussed in the open literature, most prior art focuses on ways to avoid side chemistry altogether. As disclosed herein, a specific side reaction is selectively promoted through choice of catalyst and reaction temperature to preferentially promote loss of ethylene glycol to boost the Tg of the final polymer. Thus, a higher loading of PET can be used in the blend without the anticipated limitation of Tg. Preferred catalysts to specifically promote loss of ethylene glycol to boost the Tg of the final polymer are DBTO, DOTO, $Ti(OBu)_4$ and $Ti(O^iPr)_4$.

In an embodiment, there is provided a foamable composition comprising the copolyester, co-polyesterpolycarbonate or co-polyesterpolyether as disclosed herein, and a blowing agent. In certain embodiments, the blowing agent is selected from one or more physical blowing agents, such as pentane hydrocarbons, hydrofluoroolefins, carbon dioxide, nitrogen, oxygen, water, alcohols such as methanol and ethanol, ketones including acetone, ethers such as dimethyl ether or diethyl ether, halogenated hydrocarbons such as ethylene chloride or methylene chloride, or olefins such as pentene, or a combination thereof. Examples of suitable chemical blowing agents are azides such as azodicarbonamide (AZNP), 5-phenyl tetrazole (5PT), or a mixture of citric acid and bicarbonate salts.

In another embodiment of the invention, there is provided a solid foamable bead made from any of the foamable compositions disclosed herein.

Further, the invention provides a foamed article made by either: (a) extrusion foaming of any of the foamable compositions disclosed herein, or (b) expansion of the solid foamable bead described above.

In certain embodiments, there is disclosed a method of forming the copolyester, co-polyesterpolycarbonate or co-polyesterpolyether copolymer disclosed herein, the method comprising: (i) melting a blend of at least two polymers selected from a first polyester polymer and one or more other polymer selected from one or more polycarbonate polymer and one or more other polyester polymer, or combination thereof, and in the presence of a transesterification catalyst, and, optionally, a chain coupling agent; (ii) maintaining a temperature greater than 200° C. and less than 330° C. for at least 3 minutes and no more than 180 minutes, optionally with mixing; and (iii) optionally, collecting at least a portion of any ethylene carbonate produced; and (iii) cooling to produce a solid copolymer.

In certain embodiments, at least a portion of the polyester units in the copolymer are derived from recycled polyethylene terephthalate.

In certain embodiments, reduced pressure is used to remove volatile species.

In certain such embodiments of the method, the weight ratio of first polyester polymer to the one or more other polymer may be 35:65, 40:60, 42:58, 44:56, 46:54, 48:52, 50:50, 52:48, 54:46, 56:44, 58:42, 60:40, 62:38, 64:36, 66:34, 68:32, 70:30, 72:28, 74:26, 75:25, 76:24, 78:22, 80:20, 82:18, 84:16, 86:14, 85:15. Each of the foregoing numbers can be preceded by the word "about," "at least about," or "less than about," and any of the foregoing numbers can be used singly to describe an open-ended range or in combination to describe a close-ended range. For example, the weight ratio of first polyester polymer to one or more other polymer can be at least about 50:50, about 50:50 to about 80:20, or about 50:50 to about 75:25, or less than about 85:15. As discussed above, there may be one or more other polymer, which may include other polyester polymer(s). In the event there are one or more polyester polymers included in the other polymer types, a separate embodiment exists for which the weight ratio of the total of all polyester polymers to polycarbonate polymers may be 35:65, 40:60, 42:58, 44:56, 46:54, 48:52, 50:50, 52:48, 54:46, 56:44, 58:42, 60:40, 62:38, 64:36, 66:34, 68:32, 70:30, 72:28, 74:26, 75:25, 76:24, 78:22, 80:20, 82:18, 84:16, 85:15. Each of the foregoing numbers can be preceded by the word "about," "at least about," or "less than about," and any of the foregoing numbers can be used singly to describe an open-ended range or in combination to describe a closed-ended range. For example, the weight ratio of the total of all polyester polymers to polycarbonate polymers can be at least about 50:50, about 50:50 to about 80:20, or about 50:50 to about 75:25, or less than about 85:15.

In certain embodiments, there is disclosed a product copolyester copolymer resulting from the method disclosed herein.

As discussed above, some structural units may suffer loss of a fragment of the unit, but the residual fragment of the structural unit (residue) still exists in the polymer chain. In the ratios below, the respective structural unit includes the residue thereof. In certain embodiments, a mole ratio of the polyester structural monomer unit(s) to the one or more co-monomer structural unit(s) (polycarbonate or other polyester structural units) in the copolyester, co-polyesterpolycarbonate or co-polyesterpolyether is 45:55, 46:54, 48:52, 50:50, 52:48, 54:46, 56:44, 58:42, 60:40, 62:38, 64:36, 66:34, 68:32, 70:30, 72:28, 74:26, 75:25, 76:24, 78:22, 80:20, 82:18, 84:16, 86:14, 88:12, 90:10. Each of the foregoing numbers can be preceded by the word "about," "at least about," or "less than about," and any of the foregoing numbers can be used singly to describe an open-ended range or in combination to describe a closed-ended range. For example, the mole ratio can be at least about 50:50, about 50:50 to about 80:20, or about 50:50 to about 75:25, or less than about 85:15. As discussed above, there may be one or more types of co-monomer structural units, which may include other polyester structural unit types or polycarbonate structural units. In the event there are more than one co-monomer structural unit types, the ratio of the respective co-monomer structural unit types (ratio of comonomer A to comonomer B) is not particularly limited in any way.

In certain embodiments, a mole ratio of the polymerized structural units of polyethylene terephthalate (PET) or PET residue to the one or more polycarbonate (PC) structural units or PC residue (in polymerized form) in the co-polyesterpolycarbonate (or co-polyesterpolyether) is 45:55, 46:54, 48:52, 50:50, 52:48, 54:46, 56:44, 58:42, 60:40, 62:38, 64:36, 66:34, 68:32, 70:30, 72:28, 74:26, 75:25, 76:24, 78:22, 80:20, 82:18, 84:16, 86:14, 88:12, 90:10. Each of the foregoing numbers can be preceded by the word "about," "at least about," or "less than about," and any of the foregoing numbers can be used singly to describe an open-ended range or in combination to describe a closed-ended range. For example, the mole ratio can be at least about 50:50, about 50:50 to about 80:20, or about 50:50 to about 75:25, or less than about 85:15. As discussed above, there may be one or more types of co-monomer polycarbonate structural units (or residue thereof). In the event there are more than one co-monomer polycarbonate types, the ratio of the respective co-monomer polycarbonate unit types (ratio of comonomer A or residue thereof to comonomer B or residue thereof) is not particularly limited in any way. In one such embodiment, the copolymer comprises only one type of polycarbonate co-monomer (in polymerized form), which is a bisphenol A polycarbonate structural unit or residue thereof. Also, discussed above, the polymerized structural units of polycarbonate (PC) in the polymer may remain intact (as the polycarbonate monomer in polymerized form), or a portion or all of these structural units may exist as a residual fragment (residue) that remains after loss of a $CO_2$ molecule from the carbonate functional group.

In certain embodiments, the foamable copolyester, co-polyesterpolycarbonate or co-polyesterpolyether copolymer has from 10 mole % to 40 mole % of the sum of polymerized structural units of one or more aliphatic diols where the mole % is the sum of the moles of polymerized structural units of the one or more aliphatic diols in the copolymer expressed as a percentage of the total moles of polymerized structural units that make up the copolymer. The mole % of aliphatic diols can be determined by NMR on the product of the transesterification reaction. In certain embodiments, the foamable copolyester, co-polyesterpolycarbonate or co-polyesterpolyether copolymer has a sum of polymerized structural units of one or more aliphatic diols (in mole %) of 10, 15, 20, 22, 24, 26, 28, 30, 32, 34, 36, 38, 39, 40. Each of the foregoing numbers can be preceded by the word "about," "at least about," or "less than about," and any of the foregoing numbers can be used singly to describe an open-ended range or in combination to describe a closed-ended range. A suitable mole % of polymerized structural units of the one or more aliphatic diols for the foamable copolyester may be from 15 mole % to 40 mole %, or from 20 mole % to 40 mole %, or from 20 mole % to 39 mole %, or from 20 mole % to 38 mole %. In an embodiment, the mole % of aliphatic diol is from 25 mole % to 38 mole %.

In certain embodiments, the foamable copolyester, co-polyesterpolycarbonate or co-polyesterpolyether copolymer has a glass transition temperature, Tg, (° C.) of 80, 85, 90, 95, 98, 100, 102, 105, 110, 115, 120, 125 or 130. Each of the foregoing numbers can be preceded by the word "about," "at least about," or "less than about," and any of the foregoing numbers can be used singly to describe an open-ended range or in combination to describe a closed-ended range. A suitable Tg for the foamable copolyester may be from 80° C. to 125° C., or from 85° C. to 125° C., or from 85° C. to $I_{20}$° C., or from 90° C. to 115° C. In an embodiment, the Tg is from 95° C. to 110° C.

In certain embodiments, the foamable copolyester, co-polyesterpolycarbonate or co-polyesterpolyether copolymer has an enthalpy of melting, "$\Delta Hm$ before foaming", (J/g) of 0, 0.1, 1, 2, 3, 4, 5, 6, 7, 8, 9, 10, 11, 12, 13, 14, 15. Each of the foregoing numbers can be preceded by the word "about," "at least about," or "less than about," and any of the foregoing numbers can be used singly to describe an open-ended range or in combination to describe a closed-ended range. A suitable $\Delta Hm$ before foaming for the foamable copolyester is no greater than 15 J/g, or no greater than 10 J/g, or it may be from 0 J/g to 15 J/g, or from 0 J/g to 10 J/g, or from 0.1 J/g to 15 J/g, or from 0.1 J/g to 10 J/g. Preferably, it is 0 J/g or no greater than 5 J/g.

In certain embodiments, the foamable copolyester, co-polyesterpolycarbonate or co-polyesterpolyether copolymer has an enthalpy of melting or crystallization, "$\Delta H_m$ after foaming", (J/g) of 0, 1, 2, 3, 4, 5, 6, 7, 8, 9, 10, 11, 12, 13, 14, 15. Each of the foregoing numbers can be preceded by the word "about," "at least about," or "less than about," and any of the foregoing numbers can be used singly to describe an open-ended range or in combination to describe a closed-ended range. $\Delta H_m$ after foaming means that the measurement of $\Delta H_m$ occurs after exposure to hydrostatic pressure of $CO_2$. A suitable $\Delta H_m$ after foaming for the foamable copolyester is no greater than 15 J/g, or no greater than 12 J/g, or no greater than 10 J/g, or it may be from 0 J/g to 15 J/g, or from 0 J/g to 12 J/g, or from 0 J/g to 10 J/g, or from 0.1 J/g to 15 J/g, or from 0.1 J/g to 10 J/g. Preferably, it is 0 J/g, or no greater than 10 J/g, or no greater than 5 J/g.

In certain embodiments, the copolyester, co-polyesterpolycarbonate or co-polyesterpolyether copolymer has a Koenig B value (dimensionless) of greater than 0.90 for copolymers having a ratio of polyester:polycarbonate structural units in the copolymer, or polyester:(polycarbonate+polyether) structural units in the copolymer, in a mole ratio of from 65:35 to 85:15. Within the described range of mole ratio, the copolyester, co-polyesterpolycarbonate or co-polyesterpolyether copolymer has a Koenig B value (dimensionless) of 0.8, 0.9, 1.0, 1.1, 1.2, 1.3, 1.4, 1.5, 1.6, 1.7, 1.8, 1.9, 2.0. Each of the foregoing numbers can be preceded by the word "about," "at least about," or "less than about," and any of the foregoing numbers can be used singly to describe an open-ended range or in combination to describe a closed-ended range. For example, the B value may be greater than 1.0, or it may be from 0.9 to 2.0, or from 1.0 to 2.0, or from 1.1 to 1.7.

In certain embodiments, the copolyester, co-polyesterpolycarbonate or co-polyesterpolyether copolymer has a B[X] value or B[X+X'] of greater than 0.20, where B is the Koenig B value for copolymer randomness, and [X] is the molar fraction of comonomer polycarbonate and/or polyether structural units in the copolymer, and [X+X'] is the molar fraction of comonomer polycarbonate and/or polyether structural units, including any units comprising residue fragments thereof, in the copolymer. The copolyester, co-polyesterpolycarbonate or co-polyesterpolyether copolymer has a B[X] or B[X+X'] value (dimensionless) of 0.18, 0.20, 0.22, 0.24, 0.26, 0.28, 0.30, 0.35, 0.40, 0.45, 0.50, 0.55, 0.60, 0.65, 0.70, 0.75 or 0.80. Each of the foregoing numbers can be preceded by the word "about," "at least about," or "less than about," and any of the foregoing numbers can be used singly to describe an open-ended range or in combination to describe a closed-ended range. For example, the B[X] or B[X+X'] value may be greater than 0.22, or it may be from 0.18 to 0.80, or from 0.20 to 0.75, or from 0.22 to 0.75, or from 0.25 to 0.70.

The invention relates to a copolyester polymer prepared from one or more virgin or recycled polyesters, such as PET and/or PETG, and one or more virgin or recycled polycarbonate polymer, such as, for example, bisphenol A, wherein the resulting copolyester has a number of surprising attributes. For example, the foamable polyester (for example, PET) based copolymers can be foamed to produce a density of less than 0.1 g/cm$^3$, which is in marked contrast to other current art or commercial products based on PET (virgin or recycled). This permits the use of these starting materials, and especially PET, in a range of product fields and applications (discussed below), previously inaccessible to PET or PETG (virgin or recycled).

Because of the chemical structure of PET, it is less flammable than polystyrene (the main polymer used in thermoplastic insulation foam) and therefore the foam articles based on an amorphous form of polyesters, either virgin or recycled, and whether derived from PET/PC or PETG/PC, are less flammable and do not require additional flame retardant to meet limiting oxygen index (LOI) requirements in the U.S. The flame performance of such foams is sufficient to pass building and construction code requirements without the need for a flame retardant additive in the foam formulation. Further, it is anticipated that the German B2 test can be passed without the need for a flame retardant additive. Even for the more stringent building codes, the use of PET as a base resin in copolyester polymers for insulation foam eliminates the need for a halogenated flame retardant and for certain cases a non-halogenated flame retardant may instead be added to meet stringent building codes.

The copolyesters of the present invention have increased blowing agent solubility (for numerous blowing agents including $CO_2$, 1-chloro-3,3,3-trifluoropropene (HFO 1233zd), cyclopentane, acetone, and methanol), such that a wide range of extrusion or expansion processes may be used to generate foam articles.

The product of the invention may be used in multiple fields and applications, for example, and without limitation, as packaging materials, or as building materials, such as, for example, building insulation or air sealant applications, cushioning packaging, 3-D printing, thermoforming, and many more.

Some embodiments disclosed herein are set forth in the following clauses, and any combination of these clauses (or portions thereof) may be made to define an embodiment.

Clause 1: A copolyester, co-polyesterpolycarbonate or co-polyesterpolyether copolymer comprising either differing polyester units, or comprising polyester units and polycarbonate or polyether units or both, and optionally further comprising one or more coupling agents, and being characterized by having:
  (i) polymerized units of one or more aromatic diacid monomer;
  (ii) from 10 mole % to 40 mole % of the sum of polymerized units of one or more aliphatic diols where the mole % is the sum of the moles of polymerized units of the one or more aliphatic diols in the copolymer expressed as a percentage of the total moles of polymerized units that make up the copolymer;
  (iii) a primary Tg between 85° C. and 125° C. as measured from the inflection point on second heatup of the DSC curve using a heating/cooling rate of 10° C./min; and
  (iv) a heat of melting $\Delta H_m$ peak no greater than 10 J/g after exposure to hydrostatic pressure of 1000 psi $CO_2$ at 135° C. for 4 hours.

Clause 2: The copolyester, co-polyesterpolycarbonate or co-polyesterpolyether copolymer of clause 1 having a B[X] or B [X+X'] value of 0.20 or greater, where B is the Koenig B value for copolymer randomness, [X] is the molar fraction of comonomer polyester structural units or of comonomer polycarbonate and/or polyether structural units, and [X+X'] is the molar fraction of comonomer polyester structural units or of comonomer polycarbonate and/or polyether structural units, including any units comprising residue fragments thereof, in the copolymer. In one embodiment, the copolymer has a B[X] or B[X+X'] value of greater than 0.22.

Clause 3: The copolyester, co-polyesterpolycarbonate or co-polyesterpolyether copolymer of clause 1 having a Koenig B value of greater than 0.90 for copolymers having a ratio of polyester:polycarbonate structural units in the copolymer, or polyester:(polycarbonate+polyether) structural units in the copolymer, in a mole ratio of from 65:35 to 85:15.

Clause 4: The copolyester, co-polyesterpolycarbonate or co-polyesterpolyether copolymer of any one of clauses 1 to 3, wherein the one or more aromatic diacid monomers are selected from phthalic acid, terephthalic acid, isophthalic acid, or 2,5-furandicarboxylic acid.

Clause 5: The copolyester, co-polyesterpolycarbonate or co-polyesterpolyether or copolymer of any one of clauses 1 to 4, further comprising one or more coupling agents. In one embodiment, the one or more coupling agent is pyromellitic dianhydride.

Clause 6: The copolyester, co-polyesterpolycarbonate or co-polyesterpolyether or copolymer of any one of clauses 1 to 5, wherein at least a portion of the polyester units in the copolymer are derived from recycled polyethylene terephthalate.

Clause 7: The copolyester, co-polyesterpolycarbonate or co-polyesterpolyether copolymer of any one of clauses 1 to 6, wherein the one or more diols are selected from ethylene glycol, 1,2-propylene glycol, 1,3-propylene glycol, butylene glycol, cyclohexane dimethanol, isosorbide, and spiroglycol. In one embodiment, the one or more diol is ethylene glycol.

Clause 8: The copolyester, co-polyesterpolycarbonate or co-polyesterpolyether copolymer of any one of clauses 1 to 7, wherein the copolyester, co-polyesterpolycarbonate or co-polyesterpolyether comprises at least 7 mole % of polymerized units of bisphenol A.

Clause 9: The copolyester, co-polyesterpolycarbonate or co-polyesterpolyether copolymer of any one of clauses 1 to 8, wherein the mole ratio of polyester polymer structural units to the total of polycarbonate polymer structural units and polyether polymer structural units is from 40:60 to 85:15, or from 50:50 to 80:20.

Clause 10: A foamable composition comprising the copolyester, co-polyesterpolycarbonate or co-polyesterpolyether copolymer of any one of clauses 1 to 9 and one or more blowing agents.

Clause 11: The foamable composition of clause 10, wherein the blowing agent is selected from one or more pentane hydrocarbon, one or more hydrofluoro olefin, carbon dioxide, nitrogen, oxygen, water, alcohols, ketones, ethers, halogenated hydrocarbons, or olefins, or combination thereof.

Clause 12: The foamable composition of clause 10, wherein the blowing agent is selected from one or more chemical blowing agents.

Clause 13: The foamable composition of any one of clauses 10 to 12 further comprising one or more of an immiscible polyolefin, a colorant, a pigment, a filler, a clay, a flame retardant agent, an infra-red attenuator, a nucleating agent, lubricants, an acid scavenger, an antistatic agent, or antioxidant, or combination thereof.

Clause 14: A solid foamable bead made from the composition of any one of clauses 10 to 13.

Clause 15: A foam or foamed article obtained from the composition of any one of clauses 10 to 13.

Clause 16: A foam or foamed article made by:
(a) extrusion foaming of the foamable composition of any one of clauses 10 to 13, or (b) expansion of the solid foamable bead of clause 14.

Clause 17: The foam or foamed article of clause 15 or 16, wherein the foam has a density of from 0.01 to 0.1 g/cm$^3$.

Clause 18: A method of forming the copolyester, co-polyesterpolycarbonate or co-polyesterpolyether copolymer of any one of clauses 1 to 9, the method comprising:
(i) melting a blend of at least two polymers selected from a first polyester polymer and one or more other polymer selected from one or more polycarbonate polymer and one or more other polyester polymer, or combination thereof, and in the presence of a transesterification catalyst, and, optionally, a chain coupling agent;
(ii) maintaining a temperature greater than 200° C. and less than 330° C. for at least 3 minutes and no more than 180 minutes, optionally with mixing;
(iii) optionally, collecting at least a portion of any ethylene carbonate produced; and
(iv) cooling to produce a solid copolymer.

Clause 19: The method of clause 18, wherein the weight ratio of first polyester polymer to one or more other polymers is from 40:60 to 85:15.

Clause 20: The method of clause 18, wherein the weight ratio of the total of all polyester polymers to polycarbonate polymers is from 40:60 to 85:15.

Clause 21: The method of any one of clauses 18 to 20, wherein reduced pressure is used to remove volatile species.

Clause 22: The method of any one of clauses 18 to 21, wherein the method further comprises the step of collecting at least a portion of any ethylene carbonate produced.

Clause 23: The method of any one of clauses 18 to 22, wherein one or more polyester polymers is recycled polyethylene terephthalate.

Clause 24: The copolyester, co-polyesterpolycarbonate or co-polyesterpolyether copolymer of any one of clauses 1 to 9 or 25 wherein at least a portion of the polyester structural units in the copolymer are derived from recycled polyethylene terephthalate.

Clause 25: A copolyester, co-polyesterpolycarbonate or co-polyesterpolyether copolymer comprising polymerized structural units selected from:
a) one or more aliphatic diol,
b) one or more aromatic diacid,
c) one or more aromatic diol,
d) one or more organic carbonate,
wherein the copolyester copolymer comprises polymerized structural units a+b
the copolyesterpolycarbonate copolymer comprises polymerized structural units a+b+c+d, and
the copolyesterpolyether copolymer comprises polymerized structural units a+b+c+optionally d, and further comprises ether functionality in the polymer backbone;
said copolymer being characterized by:
i) the polymerized structural units of one or more aliphatic diols (a) are present in an amount totaling from 15 mol % to 40 mol %, where the mol % is the sum of the moles of polymerized structural units of the one or more aliphatic diols in the copolymer expressed as a percentage of the total moles of polymerized structural units, a+b+c+d, that make up the copolymer;
ii) a primary Tg between 85° C. and 125° C. as measured from the inflection point on second heatup of the DSC curve using a heating/cooling rate of 10° C./min; and
iii) a heat of melting $\Delta H_m$ peak no greater than 10 J/g after exposure to hydrostatic pressure of 1000 psi $CO_2$ at 135° C. for 4 hours.

Similar embodiments exist for the copolyester, co-polyesterpolycarbonate or co-polyesterpolyether copolymer of clause 25 as are described in the embodiments in clauses 1-24.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

Example 1

Haake Blending Method for Melt Transesterification Reaction

In this example, bulk polymer resins were dried according to manufacturers' recommendation in either a forced air convection oven or vacuum oven. Moisture content was checked via an Omnimark Mark 2 High Performance moisture analyzer and confirmed to be 0.005% or lower. Bulk polymer resins and additives were then physically mixed together and slowly added to a Thermo-Scientific Haake melt rheometer preheated to at least 10° C. above the highest peak softening temperature of the added components. Polymer resin addition was done at relatively slow mixer speed (25-50 rpm). Once the resins were fully melted, the catalyst and/or additional additives were added, the mixer speed was then increased to 200 rpm, and the blending continued for a set time and temperature profile according to experimental conditions. All blending took place under a vigorous dry Nitrogen sweep implemented at the mixer throat. Upon completion of set blending melt and mix conditions, the mixed/reacted material was removed and placed on Teflon® pans and allowed to cool until the material could be placed in bags and stored in a dry box until testing or parts fabrication could commence. Unless otherwise noted, all percentages are in wt %, and pph is "parts per hundred" of the total polymer weight.

Example 2

Extruder Process for Melt Transesterification Reaction

Ex 2a. Tandem Twin-Single Screw Extrusion System

Continuous melt transesterification was conducted by feeding material to a co-rotating twin screw extruder (a screw diameter of 40 mm, and length to diameter ratio, L/D=45.5:1) at a rate of 75-150 lb/hr. The molten polymer mixture exiting the twin screw extruder was directly fed to a side fed single screw extruder (a screw diameter of 90 mm, 30:1 L/D), followed by an annealing tube/static mixer. The annealing section was 2.25" diameter and 24" long and the static mixer section was 12" long, containing four SMX static mixers each being 3" long. Extrudate was collected by pelletizing under water using a die face cutter. Pellet size was in the range of 3-5 mm diameter (nominally spherical).

Ex 2b. Tandem Twin-Twin Screw Extrusion System

The transesterification reactive extrusion was conducted on a tandem twin-twin screw extrusion system, consisting of the $1^{st}$ co-rotating twin-screw extruder (TEX44αIII, manufactured by Japan Steel Works (JSW)) ("primary extruder") and the $2^{nd}$ co-rotating twin-screw extruder (TEX28V, also produced by JSW) ("secondary extruder"). Specifically, 44αIII twin-screw extruder has 17 barrels with a screw diameter of 47 mm and a length-to-diameter ratio of the screw, L/D=59.5, while TEX28V twin-screw extruder has 12 barrels with a screw diameter of 28 mm and L/D of 42. The transfer pipe connecting TEX44αIII twin-screw extruder and TEX28V twin-screw extruder has a diameter of 22 mm and a length of 1592.5 mm. The catalysts were compounded with polyester to yield catalyst concentrates with a concentration of 2.5-7 wt %. Polyesters were dried in an oven overnight and packed in aluminum foil bags before the reactive extrusion. Three loss-in-weight feeders were used to feed two polyesters/resins (e.g. PET and PC) and a catalyst concentrate into the main feed throat of TEX44αIII twin-screw extruder. All the feeders and main feed throat were purged with continuous nitrogen flow. There were three vent ports in TEX44αIII twin-screw extruder, which were connected to a condensing system equipped with two knock-out pots and a vacuum pump. Similarly, TEX28V twin-screw extruder had a rear vent and two wide vent ports, which were linked to a condensing system equipped with one Multitrap pot and the other having a cooling coil as well as a vacuum pump. High vacuum was applied (at least 28" Hg vacuum level) to the condensing systems and extruders to remove volatiles generated by the transesterification reaction. The polymer melt exited from a three-hole (with a diameter of 4 mm) strand die, and it was immediately quenched in a water bath and then pelletized.

Example 3

NMR Method to Determine Degradation and Randomness Factor

Each sample was weighed out in an amount of 0.3 g and dissolved in 3.0 ml deuterated chloroform ($CDCl_3$) with 5 mM of chromium(III) acetylacetonate as the relaxation agent. Trifluoroacetic acid (TFA) (0.05-0.2 ml) was also added to aid dissolving the polymeric material in the presence of high crystallinity. One dimensional (1D) quantitative $^{13}C$ NMR experiments were performed on a 600 MHz Bruker Avance III spectrometer equipped with a 10 mm cryogenic probe. Quantitative $^{13}C$ NMR spectroscopy employed the single pulse method using the inverse-gated $^{1}H$ decoupling with a total repetition time of 10 s and acquisition time of 1.7 s. The receiver gain was optimized and 1024 scans were recorded to generate adequate spectral sensitivity for quantitative analysis. The spectral width was set to 250 ppm with the center of frequency located at 100 ppm.

Example 4

DSC Method for Quantifying Crystallinity

Samples were weighed and sealed in aluminum DSC pans. The sample weights were approximately 5 to 10 mg for each sample. The samples were scanned in a TA Instruments Q2000 DSC (Differential Scanning calorimeter) with an auto-sampler, nitrogen purge of 50 ml/min. The heating rate was 10° C./min and the temperature profile between 20° C., 280° C., and back to 20° C. was applied twice for each sample. The scans were analyzed using Universal Analysis V4.7A software. The key output parameters of the DSC tests were the temperature of glass transition and the temperatures and enthalpies of melting and crystallization of the sample. Analysis of samples prior to $CO_2$ soaking was conducted on the second ramp of temperature. After exposure to hydrostatic pressure of 1000 psi $CO_2$ at 135° C. for 4 hours, analysis of samples was conducted on the first ramp of temperature. Glass transition temperature (Tg) was measured as the inflection point of the baseline step transition and is reported in degrees Celsius. Enthalpy of melting or crystallization were measured by using a linear baseline estimation for the area of the peak and is reported as J/g. Considering that the enthalpy of crystallization for crystalline PET is 140 J/g, one can estimate that an enthalpy of crystallization less than 10 J/g would represent approximately 7% crystallinity or less, and an enthalpy of crystallization less than 5 J/g would represent a crystallinity of under 4%.

Example 5

Extruder Process for Expandable Beads

Transesterified copolyester is melt blended with one or more physical blowing agent, for example n-pentane, cyclopentane or 1-chloro-3,3,3-trifluoropropene (HFO 1233 zd) under pressure (>1000 psi) using a single screw extruder which feeds into a mixer, where the blowing agent is introduced. The polymer-blowing agent blend is then cooled using additional mixing elements (or heat exchangers) prior to exiting through a multi-hole die with the desired diameters such that a cylindrical pellet (or spherical bead) can be produced in the range of 0.5-1 mm (diameter). The bead can be quench cooled with water or air.

Example 6

GPC Method

Samples were prepared by adding approximately 0.04 g of polymer in 20 mL of chloroform at ambient temperature and placing on a mechanical shaker overnight. The solution was filtered through a 0.2 μm PTFE syringe filter prior to injection. Using a Waters 2690 pump/autosampler set to 1 mL/minute with continuous vacuum degassing, 50 microliters of solution was injected into a Two Agilent Technology PL gel mixed-C column (7.5 mm inner diameter, by 300 mm in length, by 5 micron particle size), held at 40° C. A Shodex RI-501EX differential refractive index detector, set at 40° C., was used to measure molecular weight. Narrow MWD PS standards from Agilent Laboratories were used for calibration over the molecular weight range: 3,740 to 580,000 g/mol. Data were acquired and reduced using Cirrus SEC/GPC software version 3.3 from Agilent Technology.

Example 7

Foamability Assessment Method

To assess foamability of comparative and inventive examples, a sample was compression molded into a 1.3 mm thick film (25 tons of pressure at 180° C. for 5 minutes). A portion of the pressed film (approximately 7 mm×7 mm in area) was placed in a pressure vessel which was preheated to 125° C. The vessel was then pressurized to 1000 psi using carbon dioxide, and the sample allowed to soak for 3-4 hours to allow dissolution of the gas into the polymer. The pressure was then rapidly released to induce foaming in the sample. Successful foaming was determined by the visual observation of void formation in the polymer sample and corresponding increase in sample volume by at least 50%.

Example 8

In this example, co-polyesterpolycarbonate polymers (PC/PET) were prepared via a catalyzed transesterification reaction starting from the constituent polyester (PET) and polycarbonate (bisphenol A). For the purposes of defining the range of PC/PET copolyester copolymer compositions and the range of ethylene glycol units which are included in this invention, a series of blends were generated with increasing levels of PET in the formulation, from which the catalyzed transesterification reaction produced the copolyester. B [X] in the tables below is B[X+X'] (meaning, it includes the residue fragments of X). And $CO_2$ loss (mol %) is the mole % of total PC monomer units that lost $CO_2$ during the reaction.

In Table 1, and the following tables, the last column (labeled "Batch Foam $CO_2$") refers to a screening test for foamability, performed on compression molded thick films of the product, which can utilize small scale samples of the modified polyesters (see "Foamability Assessment Method", above).

TABLE 1

Range of PC/PET Copolymer Compositions and Ethylene Glycol Content in Final Copolymer

| Ex.[1] | Wt. %[2] PET | Initial EG (mol. %) | Catalyst[3] | Product Tg (° C.) | B | B[X] | $CO_2$ loss (mol. %) | Final EG (mol. %) | $\Delta H_m$ before foaming (J/g) | $\Delta H_m$ after foaming (J/g) | Batch Foam $CO_2$ |
|---|---|---|---|---|---|---|---|---|---|---|---|
| 1 | 80 | 42 | FASCAT | 88 | 1.17 | 0.18 | 86 | 41 | 0 | 20 | no |
| 2 | 75 | 40 | FASCAT | 89 | 1.12 | 0.22 | 77 | 38 | 0 | 8 | yes |
| 3 | 75 | 40 | Ti(OBu)$_4$ | 96 | 1.25 | 0.25 | 56 | 35 | 0 | 0 | yes |
| 4 | 65 | 36 | FASCAT | 98 | 1.34 | 0.39 | 85 | 33 | 0 | 0 | yes |
| 5 | 50 | 29 | Ti(OBu)$_4$ | 122 | 1.67 | 0.72 | 69 | 21 | 0 | 0 | yes |

[1]Ex. 1-5 were blended at 275° C. for 30 minutes using virgin PET and virgin PC (Makrolon 5138) in the presence of the catalysts shown (all catalysts were added at a level of 2000 ppm). EG is ethylene glycol; PET is polyethylene terephthalate; PC is polycarbonate.
[2]Wt.% PET is the initial weight % of PET in the blend prior to the transesterification reaction. Initial weight % PC = 100 − Initial weight % PET.
[3]The catalysts were as follows: "FASCAT" is monobutyl tin oxide (MBTO); Ti(OBu)$_4$ is titanium(IV) tetrabutoxide.

Based on the findings of this series, the foamable copolyester product may contain up to 40 mole % ethylene glycol (EG) structural units. A copolyester (Ex. 1) containing 41 mole % EG structural units failed to produce a foam under the test conditions for foaming. Note that EG structural unit content is defined as mole % of EG structural units expressed as a % of the total of all structural units in the backbone (in this case, there are 4 structural units in total; 2 structural units from each starting polymer, PET and PC) and is calculated with any loss of EG taken into account. All Tg values are given in degrees C., as measured by the inflection point method (described earlier).

Since PET is relatively cheap and recycled PET is cheap and plentiful, one would want to maximize the level of PET in the foamable copolymer. In the present sample, Ex. 1, the 80/20 weight ratio of starting polymers (80 wt. % PET) failed to foam (a higher $\Delta H_m$ after foaming revealed significant crystallinity, ~14% crystallinity, which in turn reflects significant blockiness due to lengths of consecutive repeat units of the PET structural diads), but both samples with starting weight ratios of 75/25 (75 wt. % PET) were successfully foamed, so some further studies focused on the starting 75/25 weight ratios. All of the samples that were successfully foamed had $\Delta H_m$ after foaming of less than 10 J/g.

Example 9

In this example, the transesterification reaction (for a 75/25 by weight PET/PC blend) was stopped at various reaction times. The amount of blockiness in the copolymer was determined by $^{13}$C NMR as described herein, and the Koenig B values for monomer distribution in a polymer chain were evaluated (Table 2, and see also FIG. 1).

TABLE 2

Effect of Degree of Reaction on B Value

| Ex.[1] | Time (min.) | Initial EG (mol. %) | Product Tg (° C.) | B | B[X] | $CO_2$ loss (mol. %) | Final EG (mol. %) | $\Delta H_m$ before foaming (J/g) | $\Delta H_m$ after foaming (J/g) | Batch Foam $CO_2$ |
|---|---|---|---|---|---|---|---|---|---|---|
| 2a | 5 | 40 | 89 | 0.30 | 0.06 | 21 | 39 | 0.84 | 24 | no |
| 2b | 10 | 40 | 89 | 0.47 | 0.09 | 33 | 39 | 0 | 21 | no |
| 2c | 15 | 40 | 90 | 0.66 | 0.13 | 46 | 39 | 0 | 19 | no |
| 2d | 20 | 40 | 90 | 0.86 | 0.17 | 59 | 39 | 0 | 16 | no |
| 2e | 25 | 40 | 91 | 1.02 | 0.20 | 70 | 39 | 0 | 6.4 | yes |
| 2f | 30 | 40 | 89 | 1.12 | 0.22 | 77 | 38 | 0 | 8.3 | yes |

[1]Ex. 2a-2f were blended at 275° C. for various reaction duration (from 5 minutes up to 30 minutes) using a 75/25 wt. ratio in the blend of virgin PET and virgin PC (Makrolon 5138) in the presence of the FASCAT ® catalyst added at a level of 2000 ppm.

Based on the reaction series shown in Table 2, a B value greater than 0.90 is desired for sufficient randomization of the original PET repeat units to avoid crystallization during exposure to hydrostatic $CO_2$ pressure. Thus, a polymer with a B value 0.90 or greater is considered suitable for foaming. The four copolyester copolymer products that fail to produce a stable foam all have $\Delta H_m$ (after $CO_2$ exposure) of greater than 16 J/g; whereas the two copolyester copolymer products that successfully produce a stable foam both have $\Delta H_m$ (after $CO_2$ exposure) of less than or equal to 8.3 J/g.

Example 10

In this example, a variety of catalysts were explored and demonstrated to promote transesterification reaction with PET, resulting in a range of blockiness and final Tg values. The resulting copolyesters were investigated for ability to produce stable foams under the test conditions described herein (Table 3).

TABLE 3

Transesterification Catalysts and Effect on Copolymer Blockiness and By-Products

| Ex.[1] | Wt. % PET | Initial EG (mol. %) | Catalyst[2] | Product Tg (° C.) | B | B[X] | $CO_2$ loss (mol. %) | Final EG (mol. %) | $\Delta H_m$ before foaming (J/g) | $\Delta H_m$ after foaming (J/g) | Batch Foam $CO_2$ |
|---|---|---|---|---|---|---|---|---|---|---|---|
| 6 | 75 | 40 | none | 89 | 0.36 | 0.07 | 25 | 39 | 5.2 | 30 | no |
| 7 | 75 | 40 | FASCAT | 89 | 0.77 | 0.15 | 44 | 40 | 0 | 22 | no |
| 8 | 75 | 40 | Ce(OAc)$_3$ | 89 | 1.19 | 0.24 | 83 | 39 | 0 | 1.6 | yes |
| 9 | 75 | 40 | Ca(OAc)$_2$ | 90 | 0.51 | 0.10 | 34 | 40 | 0 | 15 | no |
| 10 | 75 | 40 | Yb(III) | 91 | 1.21 | 0.24 | 82 | 39 | 0 | 9.5 | yes |
| 11 | 75 | 40 | DBTO | 95 | 1.22 | 0.24 | 41 | 34 | 0 | 1.6 | yes |
| 12 | 75 | 40 | DOTO | 96 | 1.25 | 0.25 | 65 | 36 | 0 | 1.5 | yes |
| 13 | 75 | 40 | Ti(OBu)$_4$ | 96 | 1.25 | 0.25 | 48 | 35 | 0 | 1.5 | yes |

[1]Ex. 6-13 were blended at 230° C. for 30 minutes (after an initial ~2 minutes at 275° C. to melt PET) except for 6 and 10, which were blended at 275° C. for the entire 30 minutes. All samples used virgin PET, virgin PC (Makrolon 5138), and 2000 ppm total of indicated catalyst.
[2]The catalysts were as follows: "FASCAT" is monobutyl tin oxide (MBTO); Ti(OBu)$_4$ is titanium(IV) tetrabutoxide; Ce(OAc)$_3$ is cerium (III) acetate; Ca(OAc)$_2$ is actually a 1:1 ratio of mixed calcium (II) acetate and antimony (III) oxide (SB$_2$O$_3$) catalyst; Yb(III) is ytterbium (III) acetoacetonate; DBTO is dibutyl tin oxide; DOTO is dioctyl tin oxide; and Ti(OBu)$_4$ is titanium(IV) tetrabutoxide.

Preferred catalysts generate a B value greater than 0.90. More preferred are catalysts which promote EG loss, which results in higher Tg. Even more preferred are catalysts which promote EG loss, with less than 50% $CO_2$ loss, as evidenced in samples 11 and 13.

Example 11

The use of recycled raw materials for the formulation will inherently introduce a small degree of ternary or quaternary blend due to contamination from other recycled polymers. In this example, deliberate addition of small amounts of typical recycle contaminants (at typical levels for contaminants, for example, 0.05 wt. % or 0.15 wt. %) were added into the reactant blend mix prior to the catalyzed transesterification reaction. The effect of contaminants on foaming ability was evaluated as above (Table 4; reaction conditions shown in the footnote).

TABLE 4

Effect on PC/PET Copolymers of Potential Contaminates in Recycled Resins

| Ex.[1] | Wt. % PET | Additive[2] | Wt. % Additive | Product Tg (° C.) | $\Delta H_m$ before foaming (J/g) | $\Delta H_m$ after foaming (J/g) | Batch Foam $CO_2$ |
|---|---|---|---|---|---|---|---|
| 11 | 75 (V) | none | none | 95 | 0 | 0 | yes |
| 14 | 75 (R) | PVC | 0.05 | 97 | 0 | 0 | yes |
| 15 | 75 (R) | PE | 0.05 | 96 | 0 | 0 | yes |

TABLE 4-continued

Effect on PC/PET Copolymers of Potential Contaminates in Recycled Resins

| Ex.[1] | Wt. % PET | Additive[2] | Wt. % Additive | Product Tg (° C.) | $\Delta H_m$ before foaming (J/g) | $\Delta H_m$ after foaming (J/g) | Batch Foam $CO_2$ |
|---|---|---|---|---|---|---|---|
| 16 | 75 (R) | LDPE | 0.05 | 96 | 0 | 0 | yes |
| 17 | 75 (R) | PP | 0.05 | 96 | 0 | 0 | yes |

TABLE 4-continued

Effect on PC/PET Copolymers of Potential Contaminates in Recycled Resins

| Ex.[1] | Wt. % PET | Additive[2] | Wt. % Additive | Product Tg (° C.) | $\Delta H_m$ before foaming (J/g) | $\Delta H_m$ after foaming (J/g) | Batch Foam $CO_2$ |
|---|---|---|---|---|---|---|---|
| 18 | 75 (V) | PBT | 0.15 | 96 | 0 | 0.77 | yes |
| 19 | 75 (R) | PS | 0.05 | 97 | 0 | 0 | yes |
| 20 | 75 (V) | PS | 0.15 | 99 | 0 | 0.35 | yes |
| 21 | 75 (V) | LDPE | 0.15 | 97 | 0 | 0.75 | yes |

[1]Ex. 14-21 were blended at 275° C. for 30 minutes using 75 wt.% virgin (V) or recycled (R) PET, 25 wt.% virgin PC (17-22 NT or Makrolon 5138), and 2000 ppm of DBTO as the catalyst.
[2]The additives studied as potential contaminants are: PVC, polyvinyl chloride; PE, polyethylene; LDPE, low density polyethylene; PP, polypropylene; PBT, polybutylene terephthalate; and PS, polystyrene.

Ex. 14-21 (Table 4) demonstrate that small amounts of a third polymer (different from the first two) do not significantly affect the ability of the copolyester to produce stable foams and such minor contaminant copolymers are within the scope of the invention. In all cases, the blend performed similarly to its control counterpart example containing no additive (Ex. 11).

Example 12

In the following samples, the ability to form foamable copolyester copolymers was extended to include ternary copolymers. Table 5 shows the results for PET/PETG/PC ternary copolymers, and shows that some PET/PETG/PC ternary copolymer compositions are able to produce stable foams. (PETG is glycol modified polyethylene terephthalate).

TABLE 5

Compositional Variations and Ternary Copolymers with PETG[1]

| Ex.[2] | Wt. % PET | Wt. % PETG | Wt. % PC | Initial EG (mol. %) | Prod. Tg (° C.) | $\Delta H_m$ before foaming (J/g) | $\Delta H_m$ after foaming (J/g) | Batch Foam $CO_2$ |
|---|---|---|---|---|---|---|---|---|
| 22 | 0 | 75 | 25 | 28 | 96 | 0 | 0.11 | yes |
| 23 | 25 | 67 | 8 | 37 | 79 | 0 | 21 | no |
| 24 | 37.5 | 50 | 12.5 | 38 | 82 | 0 | 19 | no |
| 25 | 56 | 25 | 19 | 39 | 80 | 0.75 | 18 | no |
| 26 | 50 | 25 | 25 | 37 | 93 | 0 | 0 | yes |
| 27 | 65 | 10 | 25 | 40 | 96 | 0 | 0.67 | yes |
| 28 | 70 | 5 | 25 | 40 | 94 | 0 | 1.1 | yes |

[1]PETG is glycol modified polyethylene terephthalate (e.g., Eastar GN001).
[2]Ex. 22 was blended at 275° C. for 30 minutes using Eastar GN001 and Makrolon 5138, and 2000 ppm of DBTO as the catalyst. Ex. 26-28 were blended at 275° C. for 30 minutes using virgin PET, Eastar GN001, and Makrolon 5138, and 2000 ppm of FASCAT as the catalyst. Ex. 23-25 were made using the 40 mm + 90 mm extruder method as described in Example 2 using PET, Eastar GN001. Makrolon 3158, and 2000 ppm of DBTO as the catalyst.

Example 13

Table 6 shows the results for PET/PBT/PC ternary copolymers, and shows that some PET/PBT/PC ternary copolymer compositions are able to produce stable foams. (PBT is polybutylene terephthalate).

TABLE 6

Compositional Variations and Ternary Copolymers with PBT

| Ex.[1] | Wt. % PET | Wt. % PBT | Wt. % PC | Initial EG (mol. %) | Prod. Tg (° C.) | $\Delta H_m$ before foaming (J/g) | $\Delta H_m$ after foaming (J/g) | Batch Foam $CO_2$ |
|---|---|---|---|---|---|---|---|---|
| 29 | 0 | 75 | 25 | 40 | 53 | 22 | 26 | no |
| 30 | 50 | 25 | 25 | 40 | 81 | 0 | 0 | yes |
| 31 | 65 | 10 | 25 | 40 | 91 | 0 | 0.57 | yes |
| 32 | 70 | 5 | 25 | 40 | 92 | 0 | 0.43 | yes |
| 33 | 75 | 25 | 0 | 50 | 68 | 27 | 37 | no |

[1]Ex. 29 & 33 were blended at 275° C. for 30 minutes using virgin PET, poly(butylene terephthalate), and Makrolon 5138, and 2000 ppm of DBTO as the catalyst. Ex. 30-32 were made similarly to Ex. 29, only using 2000 ppm FASCAT as the catalyst.

Example 14

In this example, Table 7 shows the results for PET/PTF/PC ternary copolymers, and shows that some PET/PTF/PC ternary copolymer compositions are able to produce stable foams. (PTF is polytrimethylene furanoate).

TABLE 7

Compositional Variations and Ternary Copolymers with PTF

| Ex.[1] | Wt. % PET | Wt. % PTF | Wt. % PC | Initial EG (mol. %) | Prod. Tg (° C.) | $\Delta H_m$ before foaming (J/g) | $\Delta H_m$ after foaming (J/g) | Batch Foam $CO_2$ |
|---|---|---|---|---|---|---|---|---|
| 34 | 67.5 | 7.5 | 25 | 41 | 91 | 0 | 2.7 | yes |
| 35 | 37.5 | 37.5 | 25 | 41 | 8178 | 0 | 1.4 | yes |

[1]Ex. 34 and 35 were blended at 275° C. for 30 minutes using virgin PET, Makrolon 5138, PTF from DuPont, and 2000 ppm of DBTO as the catalyst.

Example 15

In this example, Table 8 shows the results for ternary copolymers resulting from the transesterification reaction of the ternary blend using PET, PC and Tritan® FX200, and shows that some of these ternary copolymer compositions are able to produce stable foams. (Tritan® FX200 is polyethylene terephthalate modified with 2,2,4,4-Tetramethyl-1,3-cyclo-butanediol (CBDO), which results in a copolyester comprising a mixture of polymerized units of diols: ethylene glycol and 2,2,4,4-Tetramethyl-1,3-cyclo-butanediol).

TABLE 8

Compositional Variations and Ternary Copolymers with Tritan ® FX200

| Ex.[1] | Wt. % PET | Wt. % Tritan ® FX200[2] | Wt. % PC | Initial EG (mol. %) | Prod. Tg (° C.) | $\Delta H_m$ before foaming (J/g) | $\Delta H_m$ after foaming (J/g) | Batch Foam $CO_2$ |
|---|---|---|---|---|---|---|---|---|
| 36 | 0 | 75 | 25 | 20 | 129 | 0 | 0.51 | yes |
| 37 | 37.5 | 37.5 | 25 | 31 | 115 | 0 | 0 | yes |
| 38 | 75 | 12.5 | 12.5 | 43 | 89 | 0 | 22.8 | no |

[1]Ex. 36-38 were blended at 275° C. for 30 minutes using recycled PET, Tritan FX200, PC (17-22 AV), and 2000 ppm of DBTO as the catalyst.
[2]Tritan ® FX200 is polyethyelene terephthalate modified with 2,2,4,4-Tetramethyl-1,3-cyclo-butanediol (CBDO), which results in a copolyester comprising a mixture of polymerized units of diols: ethylene glycol and 2,2,4,4-Tetramethyl-1,3-cyclo-butanediol.

Optional ternary blends are considered to be in the scope of the invention, including partial or full replacement of the ethylene glycol repeat units (stemming from PET component) with other repeat units such as butylene glycol (from PBT), cyclohexane dimethanol (from PETG), or cyclobutanediol (from Tritan). All of these ternary blends were able to produce copolyester copolymer compositions that were foamable within the context of the foam test described herein.

While the preferred forms of the invention have been disclosed, it will be apparent to those skilled in the art that various changes and modifications may be made that will achieve some of the advantages of the invention without departing from the spirit and scope of the invention. Therefore, the scope of the invention is to be determined solely by the claims to be appended.

When ranges are used herein for physical properties, such as temperature ranges and pressure ranges, or chemical properties, such as chemical formulae, all combinations, and sub-combinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications may be made to the preferred embodiments of the invention and that such changes and modifications may be made without departing from the spirit of the invention. It is, therefore, intended that the appended claims cover all such equivalent variations as fall within the true spirit and scope of the invention.

What is claimed:

1. A copolyester, co-polyesterpolycarbonate or co-polyesterpolyether copolymer comprising either differing polyester units, or comprising polyester units and polycarbonate or polyether units or both, and optionally further comprising one or more coupling agents, and being characterized by having
    polymerized units of one or more aromatic diacid monomer;
    from 10 mole % to 40 mole % of the sum of polymerized units of one or more aliphatic diols where the mole % is the sum of the moles of polymerized units of the one or more aliphatic diols in the copolymer expressed as a percentage of the total moles of polymerized units that make up the copolymer;
    a primary Tg between 85° C. and 125° C. as measured from the inflection point on second heatup of the DSC curve using a heating/cooling rate of 10° C./min; and
    a heat of melting $\Delta H_m$ peak no greater than 10 J/g after exposure to hydrostatic pressure of 1000 psi $CO_2$ at 135° C. for 4 hours.

2. The copolyester, co-polyesterpolycarbonate or co-polyesterpolyether copolymer of claim 1 having a B[X] or B[X+X'] value of 0.20 or greater, where B is the Koenig B value for copolymer randomness, [X] is the molar fraction of comonomer polyester structural units or of comonomer polycarbonate and/or polyether structural units, and [X+X'] is the molar fraction of comonomer polyester structural units or of comonomer polycarbonate and/or polyether structural units, including any units comprising residue fragments thereof, in the copolymer.

3. The copolyester, co-polyesterpolycarbonate or co-polyesterpolyether copolymer of claim 1 having a Koenig B value of greater than 0.90 for copolymers having a ratio of polyester:polycarbonate structural units in the copolymer, or polyester:(polycarbonate+polyether) structural units in the copolymer, in a mole ratio of from 65:35 to 85:15.

4. The copolyester, co-polyesterpolycarbonate or co-polyesterpolyether copolymer of claim 1, wherein the one or more aromatic diacid monomers are selected from phthalic acid, terephthalic acid, isophthalic acid, or 2,5-furandicarboxylic acid.

5. The copolyester, co-polyesterpolycarbonate or co-polyesterpolyether or copolymer of claim 1 wherein at least a portion of the polyester units in the copolymer are derived from recycled polyethylene terephthalate.

6. The copolyester, co-polyesterpolycarbonate or co-polyesterpolyether copolymer of claim 1, wherein the one or more diols are selected from ethylene glycol, 1,2-propylene glycol, 1,3-propylene glycol, butylene glycol, cyclohexane dimethanol, isosorbide, and spiroglycol.

7. The copolyester, co-polyesterpolycarbonate or co-polyesterpolyether copolymer of claim 1, wherein the copolyester, co-polyesterpolycarbonate or co-polyesterpolyether comprises at least 7 mole % of polymerized units of bisphenol A.

8. The copolyester, co-polyesterpolycarbonate or co-polyesterpolyether copolymer of claim 1, wherein the mole ratio of polyester polymer structural units to the total of polycarbonate polymer structural units and polyether polymer structural units is from 40:60 to 85:15.

9. A foamable composition comprising the copolyester, co-polyesterpolycarbonate or co-polyesterpolyether copolymer of claim 1 and one or more blowing agents, and, optionally, further comprising an immiscible polyolefin, a colorant, a filler, a flame retardant agent, an infra-red attenuator, a nucleating agent, a lubricant, an antistatic agent, or an antioxidant, or a combination thereof.

10. The foamable composition of claim 9, wherein the blowing agent is selected from one or more pentane hydrocarbons, one or more hydrofluoroolefin, carbon dioxide, nitrogen, oxygen, water, alcohols, ketones, ethers, halogenated hydrocarbons, or olefins, or a combination thereof.

11. The foamable composition of claim 9, wherein the blowing agent is selected from one or more chemical blowing agents.

12. A foam or foamed article obtained from the composition of claim 9.

13. The foam or foamed article of claim 12 wherein the foam or foamed article is obtained by:
    (a) extrusion foaming of the foamable composition of claim 9, or
    (b) expansion of a solid foamable bead made from the foamable composition of claim 9.

14. The foam or foamed article of claim 12, wherein the foam has a density of from 0.01 to 0.1 $g/cm^3$.

15. A method of forming the copolyester, co-polyesterpolycarbonate or co-polyesterpolyether copolymer of claim 1, the method comprising:
    (i) melting a blend of at least two polymers selected from a first polyester polymer and one or more other polymer selected from one or more polycarbonate polymer and one or more other polyester polymer, or combination thereof, and in the presence of a transesterification catalyst, and, optionally, a chain coupling agent;
    (ii) maintaining a temperature greater than 200° C. and less than 330° C. for at least 3 minutes and no more than 180 minutes, optionally with mixing; and
    (iii) cooling to produce a solid copolymer.

16. The method of claim 15, wherein the weight ratio of first polyester polymer to one or more other polymers is from 40:60 to 85:15.

17. The method of claim 15, wherein the weight ratio of the total of all polyester polymers to polycarbonate polymers is from 40:60 to 85:15.

18. The method of claim 15, wherein the method further comprises the step of collecting at least a portion of any ethylene carbonate produced.

19. The method of claim 15, wherein one or more polyester polymers is recycled polyethylene terephthalate.

20. A copolyester, co-polyesterpolycarbonate or co-polyesterpolyether copolymer comprising polymerized structural units selected from:
   a) one or more aliphatic diol,
   b) one or more aromatic diacid,
   c) one or more aromatic diol,
   d) one or more organic carbonate,
   wherein the copolyester copolymer comprises polymerized structural units a+b
   the copolyesterpolycarbonate copolymer comprises polymerized structural units a+b+c+d, and
   the copolyesterpolyether copolymer comprises polymerized structural units a+b+c+optionally d, and further comprises ether functionality in the polymer backbone;
   said copolymer being characterized by:
   i) the polymerized structural units of one or more aliphatic diols (a) are present in an amount totaling from 15 mol % to 40 mol %, where the mol % is the sum of the moles of polymerized structural units of the one or more aliphatic diols in the copolymer expressed as a percentage of the total moles of polymerized structural units, a+b+c+d, that make up the copolymer;
   ii) a primary Tg between 85° C. and 125° C. as measured from the inflection point on second heatup of the DSC curve using a heating/cooling rate of 10° C./min; and
   iii) a heat of melting $\Delta H_m$ peak no greater than 10 J/g after exposure to hydrostatic pressure of 1000 psi $CO_2$ at 135° C. for 4 hours.

* * * * *